United States Patent
Saito et al.

(10) Patent No.: US 12,407,020 B2
(45) Date of Patent: Sep. 2, 2025

(54) HIGH IONIC CONDUCTIVITY POLYMER ELECTROLYTE COMPOSITIONS FOR ALKALI AND BEYOND ALKALI METAL BATTERIES

(71) Applicant: UT-Battelle, LLC, Oak Ridge, TN (US)

(72) Inventors: Tomonori Saito, Knoxville, TN (US); Michelle Lehmann, Knoxville, TN (US); Jagjit Nanda, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 701 days.

(21) Appl. No.: 17/703,371

(22) Filed: Mar. 24, 2022

(65) Prior Publication Data
US 2022/0311051 A1    Sep. 29, 2022

Related U.S. Application Data

(60) Provisional application No. 63/165,865, filed on Mar. 25, 2021.

(51) Int. Cl.
  *H01M 10/0565* (2010.01)
  *H01M 10/0525* (2010.01)
(52) U.S. Cl.
  CPC ... *H01M 10/0565* (2013.01); *H01M 10/0525* (2013.01); *H01M 2300/0082* (2013.01); *H01M 2300/0085* (2013.01)

(58) Field of Classification Search
  CPC ......... H01M 10/0565; H01M 10/0525; H01M 2300/0082; H01M 2300/0085; H01B 1/122
  See application file for complete search history.

(56) References Cited

U.S. PATENT DOCUMENTS 5,512,387 A * 4/1996 Ovshinsky ........ H01M 10/0436
  429/162
5,874,616 A * 2/1999 Howells .................. H01M 6/04
  564/82

(Continued)

OTHER PUBLICATIONS

"Zhang et al., Design and synthesis of a single ion conductingblock copolymer electrolyte with multifunctionality for lithium ion batteries, Sep. 2, 2014, RSC Advances, vol. 4" (Year: 2014).*

(Continued)

*Primary Examiner* — Milton I Cano
*Assistant Examiner* — Jesse J Efymow
(74) *Attorney, Agent, or Firm* — Scully, Scott, Murphy & Presser, P.C.

(57) ABSTRACT

A solid electrolyte composition comprising the following components: (i) an organic polymer comprising a polymeric backbone and pendant groups, wherein at least a portion of the pendant groups contain an anionic group associated with a first metal ion; (ii) a solvent homogeneously incorporated in the polymer to result in a polymer gel system; and (iii) a metal salt dissolved in the solvent in a molar concentration of 0.05 M to 1.5 M and containing a second metal ion associated with an anion, provided that the first and second metal ions are the same. Also described herein are solid-state batteries comprising: a) an anode; (b) a cathode; and (c) the solid electrolyte composition described above.

27 Claims, 9 Drawing Sheets

(56) References Cited

U.S. PATENT DOCUMENTS

| | | | | |
|---|---|---|---|---|
| 2011/0111308 | A1* | 5/2011 | Halalay | H01M 10/0525 |
| | | | | 429/344 |
| 2013/0052509 | A1* | 2/2013 | Halalay | H01M 50/403 |
| | | | | 429/129 |
| 2018/0261883 | A1* | 9/2018 | Vallee | H01M 4/382 |
| 2022/0045359 | A1 | 2/2022 | Nanda et al. | |

OTHER PUBLICATIONS

"Sekhon, Conductivity behaviour of polymer gel electrolytes: Role of polymer, Mar. 1, 2003, Bulletin of Materials Science, vol. 26" (Year: 2003).*

"Huang et al., Gel electrolytes based on an ether-abundant polymeric framework for high-rate and long-cycle-life lithium ion batteries, Apr. 29, 2014, Journal of Materials Chemistry A, vol. 27" (Year: 2014).*

"Zhao et al., Improved Single-Ion Conductivity of Polymer Electrolyte via Accelerated Segmental Dynamics, Dec. 7, 2020, ACS Applied Energy Materials, vol. 3" (Year: 2020).*

"Meek et al., Sulfonated Polymerized Ionic Liquid Block Copolymers, Apr. 29, 2016, Macromolecular Rapid Communications, vol. 37" (Year: 2016).*

Bouchet, R., et al., "Single-ion BAB triblock copolymers as highly efficient electrolytes for lithium-metal batteries", Nature Materials, Published online Mar. 31, 2013, May 2013, pp. 452-457, vol. 12.

Li, J., et al., "Synthesis of Sodium Poly[4-styrenesulfonyl(trifluoromethylsulfonyl) imide]-co-ethylacrylate] Solid Polymer Electrolytes", Received Dec. 3, 2014, Received in revised form Mar. 9, 2015, Accepted Mar. 10, 2015, Available online Mar. 12, 2015, Electrochimica Acta (2015), pp. 232-239, 175.

Li, Z., et al., "Single ion conducting lithium sulfur polymer batteries with improved safety and stability", J. Mater. Chem. A, 2018, Received May 17, 2018, Accepted Jun. 28, 2018, pp. 14330-14438, 6.

Nguyren, H.-D., et al., "Nanostructured multi-block copolymer single-ion conductors for safer high-performance lithium batteries", Energy Environ. Sci., 2018, Received Jul. 18, 2018, Accepted Oct. 3, 2018 pp. 3298-3309, 11.

Porcarelli, L., et al., "Single-Ion Conducting Polymer Electrolytes for Lithium Metal Polymer Batteries that Operate at Ambient Temperature", ACS Energy Lett. 2016, Received Jun. 20, 2016, Accepted Sep. 6, 2016, Published Sep. 6, 2016 pp. 678-682, 1.

Zhang, H., et al., "Single lithium-ion conducting solid polymer electrolytes: advances and perspectives", Chem. Soc. Rev., 2017, Received Jun. 28, 2016, pp. 797-815, 46.

* cited by examiner

HIGH IONIC CONDUCTIVITY POLYMER ELECTROLYTE COMPOSITIONS FOR ALKALI AND BEYOND ALKALI METAL BATTERIES

CROSS REFERENCE TO RELATED APPLICATION

The present application claims benefit of U.S. Provisional Application No. 63/165,865, filed on Mar. 25, 2021, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention generally relates to solid polymer electrolyte (SPE) compositions for batteries, particularly lithium-based batteries. The present invention is also directed to methods for producing the solid polymer electrolyte. The present invention is also directed to solid-state batteries, such as lithium-based and sodium-based batteries, containing a solid polymer electrolyte.

BACKGROUND OF THE INVENTION

Polymer electrolytes offer a safer alternative to conventional liquid electrolytes for lithium-ion and sodium-ion batteries due to their low flammability. All-solid-state construction of a battery generally provides improved mechanical robustness and energy density. Salt-in-polymer electrolytes have been extensively studied for battery applications, and those polymer electrolytes typically include various polar functional groups capable of solvating ions. Much of the conductivity of liquid and salt-in-polymer electrolytes is contributed by the anion, which generally results in low cation transport numbers ($t_+$) below 0.5. The low transport number causes concentration polarization at the electrodes, a reduced electrochemical stability window, and dendrite formation, all of which limits the practical application of these electrolytes for high energy density batteries utilizing an alkali metal anode.

Single-ion conducting polymeric materials may provide high cation transport numbers (>0.85), such as described in H. D. Nguyen et al., *Energ. Environ. Sci.*, 11(11), 3298-3309, 2018. However, the conductivity of single ion conducting polymer electrolytes is often too low to be utilized in practical applications ($10^{-11}$ to $10^{-6}$ S/cm at 30° C.) (e.g., R. Bouchet et al., *Nat. Mater.*, 12(5), 452, 2013). Often, a small molecule plasticizer is added to improve the ionic conductivity, in which single ion conductivities may reach as high as the $10^{-4}$ S/cm range for lithium ($10^{-5}$ S/cm for sodium) when plasticized with high dielectric carbonate solvents. However, the plasticizer often has an adverse effect on the mechanical properties, which is a significant impediment to commercialization. High mechanical strength of the polymer electrolyte is a desired yet elusive feature, in addition to ionic conductivity. Moreover, a higher mechanical strength can permit fabrication of a thinner membrane, and thinner membranes advantageously reduce the internal resistance of a battery, thereby achieving high conductance.

SUMMARY OF THE INVENTION

In one aspect, the present disclosure is directed to solid polymer electrolyte (SPE) compositions that advantageously possess: (i) a high ionic conductivity (e.g., at least or above $2.0 \times 10^{-6}$ S/cm at 30° C.), possibly comparable to that of liquid organic electrolytes, (ii) high cation transport number (e.g., at least or above 0.5, 0.6, or 0.7), and (iii) exceptional mechanical properties, particularly mechanical strength and robustness, which may be exhibited as, for example, an exceptional Young's modulus, tensile strength, shear modulus, storage modulus, elastic modulus, elongation at break, or combination thereof. The SPE described herein advantageously provides a high ionic conductivity and high transport number by combining an organic polymer having a tethered anionic group along with a suitable concentration of a separate metal salt interacting with the polymer. As the metal salt is present in addition to the tethered anion and metal counterion, the number of freely moving charges is greatly increased within the polymer matrix while maintaining a high cation transport number. The metal ion in the salt is the same as that in the polymer to avoid any additional cations being introduced to the system.

More particularly, the SPE composition includes the following components: (i) an organic polymer containing a polymeric backbone and pendant groups, wherein at least a portion of the pendant groups contain an anionic group associated with a first metal ion selected from the group consisting of lithium, sodium, potassium, magnesium, calcium, zinc, and aluminum ions; (ii) a solvent homogeneously incorporated in the polymer to result in a polymer gel system; and (iii) a metal salt dissolved in the solvent in a molar concentration of 0.05 M to 1.5 M and containing a second metal ion associated with an anion, wherein the second metal ion is selected from lithium, sodium, potassium, magnesium, calcium, zinc, and aluminum ions, provided that the first and second metal ions are the same. The polymer may be a homopolymer or a copolymer (e.g., a random, block, alternating, graft, or branched copolymer).

In another aspect, the present disclosure is directed to solid-state batteries containing the above-described SPE. The solid-state battery includes: a) an anode; (b) a cathode; and (c) an SPE composition described above. In particular embodiments, the solid-state battery is a lithium-based battery and components (i) and (iii) contain lithium ions, or the solid-state battery is a sodium-based battery and components (i) and (iii) contain sodium ions. The SPE composition may also be integrated into thin solid electrolyte separators critical for solid-state batteries with high energy density. The SPE composition may also be integrated into redox flow cells, non-aqueous fuel cells, and supercapacitors. Although the present disclosure focuses on lithium-based batteries, the SPE compositions described herein are applicable to ion-type batteries beyond lithium, including alkali metal batteries (e.g., sodium and potassium), alkaline earth batteries (e.g., magnesium and calcium), and others (e.g., zinc and aluminum).

BRIEF DESCRIPTION OF THE DRAWINGS

FIG. 6A shows DSC traces of dry membranes in sulfonic acid and TFSI H forms and plasticized TFSI Na membranes. FIG. 6B is a graph plotting modulus of the pentablock copolymer membranes in sulfonate and TFSI forms, E' is storage modulus and E" is loss modulus. FIG. 6C shows TGA traces for the pentablock copolymer membranes.

FIG. 7A shows representative stress-strain curves for the pentablock copolymer membranes. FIG. 7B is an image of the TFSI functionalized membrane.

FIG. 9A is a plot of electrolyte uptake of the TFSI Na pentablock copolymer membranes. FIG. 9B is a plot of room temperature conductivity of TFSI Na membranes. FIG. 9C is a plot of cation transport number, with a TEGDME plasticized salt-in-polymer crosslinked poly(ethylene oxide), (PEO), membrane as reference. FIG. 9D is a plot of sulfur uptake (from Tf) into TFSI Na membrane, at various salt concentrations in PC and TEGDME.

DETAILED DESCRIPTION OF THE INVENTION

Figure 1:
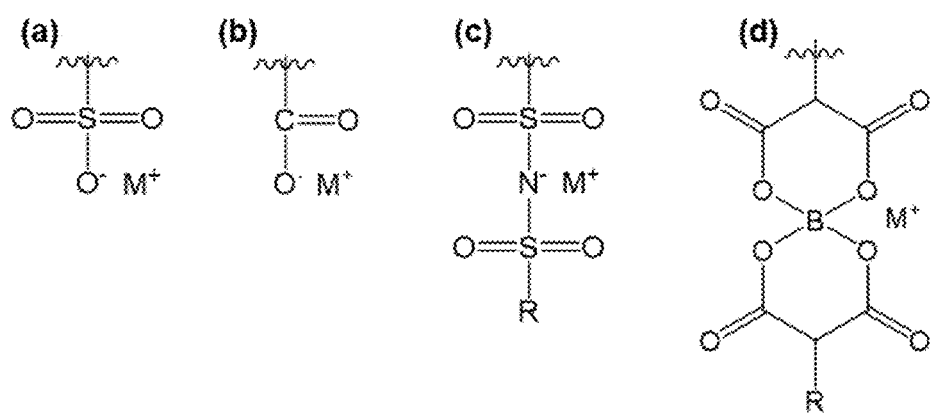
FIG. 1. Structures of a few specific examples of tethered anions, where M=an alkali metal or organic cation: (a) sulfonate, (b) carboxylate, (c) trifluoromethanesulfonimide, and (d) bis(allylmalonato) borate.

In one aspect, the present disclosure is directed to a solid polymer electrolyte (SPE) composition containing (i) an organic polymer containing a tethered anion, (ii) a solvent, and (iii) a metal salt dissolved in the solvent in a concentration of 0.05 M to 1.5 M in the solvent. The SPE advantageously possesses a combination of exceptional ionic conductivity, cation transport, and mechanical properties, as further discussed below.

Component (i), the organic polymer, may be a homopolymer or a copolymer. The copolymer may be any type of copolymer known in the art, such as a random, block, alternating, or branched (e.g., graft, star, or brush) copolymer. The organic polymer includes a polymeric backbone and pendant groups, with at least a portion of the pendant groups containing an anionic group. The ion exchange capacity (IEC) of the organic polymer is typically at least 0.5, 0.75, or 1.0 and up to 1.5, 2, 2.5, 3, 3.5, or 4 (e.g., in a range of 0.5-4 mmol/g, or more particularly, 1.0-2.5 mmol/g). The polymer is herein considered organic if the backbone, pendant groups, or both contain hydrocarbon groups or linkers, wherein the term "hydrocarbon" indicates the presence of carbon-hydrogen bonds. The polymeric backbone may be or include any of the known backbones, such as polyethylene, polypropylene, polyethylene oxide, polypropylene oxide, polyamide, polyester, phenyl-containing (e.g., diphenyl ether, diphenyl sulfide, diphenyl sulfone, or biphenylene), and polysiloxane backbones. The pendant group containing an anionic group is typically a hydrocarbon group covalently bound (tethered) to an anionic group. The pendant groups may be any of the known pendant groups, provided that at least a portion of them is modified to contain an anionic group. The pendant groups may be or include, for example, alkyl, acyl, alkylester, amino, or phenyl groups, at least a portion of which is covalently attached to the anionic group. The anionic group may be or include, for example, sulfonate ($—SO_3^-$), fluoroalkylsulfonate ($—R_F—SO_3^-$, wherein $R_F$ is a fluorine-substituted hydrocarbon linker), sulfate ($—OSO_3^-$), carboxylate ($—CO_2$), sulfonimide (e.g., fluorosulfonimide or fluoroalkylsulfonimide), borate (e.g., malonatoborate), phosphonate ($—PO_3^2$), or phosphate ($—OPO_3^2$), wherein the bond shown in each exemplary anionic group indicates the point of attachment to the pendant group or direct attachment to the polymer backbone. The anionic group is ionically associated with a first metal ion useful as a conducting species in a battery. The first metal ion may be, for example, an alkali metal ion (e.g., lithium, sodium, or potassium), magnesium, calcium, zinc, or aluminum ion.

In some embodiments, the organic polymer is a block copolymer and at least one block of the block copolymer contains the anionic group associated with the first metal ion. The block copolymer may be, for example, a diblock, triblock, tetrablock, pentablock, or higher block copolymer. In some embodiments, at least a portion of pendant groups in the block copolymer are phenyl-containing groups, and at least a portion of the pendant groups contain an anionic group. The portion of pendant groups containing an anionic group may or may not be phenyl-containing groups.

The structures of a few exemplary anionic groups are shown in FIG. 1, wherein the wavy line indicates a covalent bond to the polymer backbone, either directly or through a linker of a pendant group, and $M^+$ represents a first metal ion, such as any of those provided above, particularly an alkali metal ion. In FIG. 1, anionic group (a) is a sulfonate anion, anionic group (b) is a carboxylate ion, anionic group (c) is a trifluoromethanesulfonimide anion, and anionic group (d) is a bis-(malonato)borate group, which may be produced by polymerization of bis(allylmalonato)borate. Variations of the anionic groups shown in FIG. 1 are also possible. For example, the anionic group may alternatively be, for example, a malonatoborate group, fluoromalonatoborate group, or fluorosulfonimide ($FSO_2N^{(-)}SO_2—$) anionic group.

In some embodiments, the anionic group is a fluoroalkylsulfonimide anionic group having the following structure:

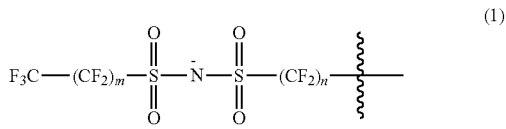

(1)

In Formula (1) above, subscripts m and n are independently 0 or an integer of 1 or above. The wavy line indicates a covalent bond to the polymer backbone, either directly or through a linker of a pendant group. Subscripts m and n may be, for example, at least 0 and up to 1, 2, 3, 4, 5, 6, 7, 8, 9, 10, or 11. In a first set of embodiments, m and n are both 0, in which case the anionic group has the formula $CF_3SO_2NSO_2^-—$. In a second set of embodiments, n is 0 and m is 1-11, in which case the anionic group has the formula $CF_3(CF_2)_m SO_2 NSO_2^-$—, wherein m has a value of 1, 2, 3, 4, 5, 6, 7, 8, 9, 10, or 11, or a value within a range bounded by any two of the foregoing values (e.g., 1-11, 1-8, 1-6, 1-4, 1-3, or 1-2). For example, in the case where n is 0 and m is 1, the resulting anion has the formula $CF_3CF_2SO_2NSO_2^-$—; or in the case where n is 0 and m is 2, the resulting anion has the formula $CF_3CF_2CF_2SO_2NSO_2^-$—. In a third set of embodiments, m is 0 and n is 1-11, in which case the anionic group has the formula $CF_3SO_2NSO_2(CF_2)_n^-$—, wherein n has a value of 1, 2, 3, 4, 5, 6, 7, 8, 9, 10, or 11, or a value within a range bounded by any two of the foregoing values (e.g., 1-11, 1-8, 1-6, 1-4, 1-3, or 1-2). For example, in the case where m is 0 and n is 1, the resulting anion has the formula $CF_3SO_2NSO_2CF_2^-$—; or in the case where m is 0 and n is 2, the resulting anion has the formula $CF_3SO_2NSO_2CF_2CF_2^-$—.

In other embodiments, the anionic group is a fluoroalkylsulfonate anionic group having the following structure:

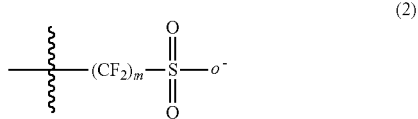

(2)

In Formula (2), m is typically at least 1 and up to 12, or within a sub-range therein, e.g., 1-10, 1-8, 1-6, 1-4, 1-3, or 1-2. The wavy line indicates a covalent bond to the polymer backbone, either directly or through a linker of a pendant group.

Component (ii), the solvent, is homogeneously incorporated in the polymer to result in a polymer-solvent gel system. The solvent is typically a polar solvent, more typically aprotic, and may be non-ionic or ionic (i.e., an ionic liquid). The solvent can be any such solvent known to be useful in and compatible with a battery. The solvent typically has a melting point of up to or less than 100, 90, 80, 70, 60, or 50° C., and more typically, below room temperature, i.e., below about 25° C., and more typically, up to or less than 20, 15, 10, 5, or 0° C. The solvent may be, for example, a carbonate, sulfone, siloxane, silane, ether, ester, nitrile, sulfoxide, amide solvent, organochloride solvent, ketone solvent, phosphate ester solvent, phosphonate ester solvent, or a mixture thereof.

In a first set of embodiments, the solvent is or includes a carbonate solvent, which may be cyclic or acyclic. Some examples of cyclic carbonate solvents include ethylene carbonate (EC), propylene carbonate (PC), butylene carbonate (BC), and chloroethylene carbonate. Some examples of acyclic (dialkyl) carbonate solvents include dimethyl carbonate (DMC), diethyl carbonate (DEC), dipropyl carbonate (DPC), ethyl methyl carbonate (EMC), methyl propyl carbonate (MPC), and ethyl propyl carbonate (EPC). The carbonate solvent may or may not also be fluorinated or chlorinated. Some examples of fluorinated carbonate solvents include fluoroethylene carbonate, fluoropropylene carbonate, and trifluoromethyl propylene carbonate.

In a second set of embodiments, the solvent is or includes a sulfone solvent. Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methyl sulfonyl)toluene, 2-(methyl sulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone).

In a third set of embodiments, the solvent is or includes a silicon-containing solvent, e.g., a siloxane or silane solvent. Some examples of siloxane solvents include hexamethyldisiloxane (HMDS), 1,3-divinyltetramethyldisiloxane, octamethyltrisiloxane, hexaethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. In some embodiments, the siloxane solvent may be fluorinated (e.g., poly(3,3,3-trifluoropropylmethylsiloxane, nonafluorohexylmethylsiloxane, or tridecafluorooctylmethylsiloxane, typically as copolymers with dimethylsiloxane units), or may contain phenyl groups (e.g., phenylmethylsiloxane-dimethylsiloxane copolymer).

In a fourth set of embodiments, the solvent is or includes an ether (glyme) solvent, which may be an acyclic or cyclic ether solvent. Some examples of acyclic ether solvents include diethyl ether, 1,2-dimethoxyethane, 1,2-diethoxyethane, diglyme (bis(2-methoxyethyl) ether), triglyme (triethylene glycol dimethyl ether), tetraglyme (tetraethylene glycol dimethyl ether), ethylene glycol monomethyl ether, ethylene glycol dimethyl ether, ethylene glycol diethyl ether, ethylene glycol monophenyl ether, ethylene glycol diphenyl ether, propylene glycol monomethyl ether, propylene glycol dimethyl ether, diethylene glycol monomethyl ether, triethylene glycol monomethyl ether, tetraethylene glycol monomethyl ether, dipropylene glycol methyl ether, dipropylene glycol dimethyl ether, pentaethylene glycol dimethyl ether, hexaethylene glycol dimethyl ether, 2-ethoxyethyl acetate, propylene glycol methyl ether acetate (PGMEA), and diphenyl ether. Some examples of cyclic ether solvents include 1,3-dioxolane, tetrahydrofuran, 2-methyltetrahydrofuran, tetrahydropyran, 1,4-dioxane, 12-crown-4, and 15-crown-5. The acyclic or cyclic ether solvent may or may not also be fluorinated. The fluorinated ether solvent may be, for example, a mono-, di-, tri-, tetra-, penta-, hexa- or per-fluoro derivative of any of the foregoing ether solvents. Some examples of fluorinated acyclic ether solvents include 1,1,2,2-tetrafluoroethyl-2,2,3,3-tetrafluoropropyl ether, bis (2,2,2-trifluoroethyl)ether, perfluoro-1,2-dimethoxyethane, and perfluorodiglyme.

In a fifth set of embodiments, the solvent is or includes an ester (carboxylate) solvent, which may be an acyclic or cyclic ester solvent. Some examples of acyclic ester solvents include methyl acetate (MA), ethyl acetate (EA), n-propyl acetate, isopropyl acetate, methyl formate (MF), ethyl formate (EF), n-propyl formate (PF), n-butyl formate, t-butyl formate, methyl propionate (MP), ethyl propionate (EP), propyl propionate, methyl butyrate (MB), and ethyl butyrate (EB). Some examples of cyclic ester solvents (i.e., lactone solvents) include γ-butyrolactone, α-methyl-γ-butyrolactone, β-butyrolactone, β-propiolactone, γ-valerolactone, δ-valerolactone, α-bromo-γ-butyrolactone, γ-phenyl-γ-butyrolactone, ε-caprolactone, γ-caprolactone, δ-caprolactone, γ-octanolactone, γ-nanolactone, γ-decanolactone, and δ-decanolactone. The acyclic or cyclic ester solvent may or may not also be fluorinated. The fluorinated ester solvent may be, for example, a mono-, di-, tri-, tetra-, penta-, hexa- or per-fluoro derivative of any of the foregoing ester solvents. Some examples of fluorinated acyclic ester solvents include trifluoromethyl acetate, 2,2,2-trifluoroethyl acetate, 2,2,2-trifluoroethyl butyrate, trifluoromethyl formate, and trifluoroethyl formate. An example of a fluorinated cyclic ester solvent is α-fluoro-ε-caprolactone.

In a various other embodiments, the solvent is or includes a nitrile solvent, amide solvent, organochloride solvent, ketone solvent, sulfoxide solvent, phosphate ester solvent, or phosphonate ester solvent. Some examples of nitrile solvents include acetonitrile, propionitrile, and butyronitrile. Some examples of amide solvents include formamide, N,N-dimethylformamide, N,N-diethylformamide, acetamide, dimethylacetamide, diethylacetamide, gamma-butyrolactam, and N-methylpyrrolidone (NMP). Some examples of organochloride solvents include methylene chloride, chloroform, 1,1,1-trichloroethane, trichloroethylene, and perchloroethylene. Some examples of ketone solvents include acetone and 2-butanone. An example of a sulfoxide solvent is dimethyl sulfoxide. Some examples of phosphate ester solvents include trimethyl phosphate, triethyl phosphate, tripropyl phosphate, and tributyl phosphate. An example of a phosphonate ester solvent is dimethyl methylphosphonate. The solvent may also be, for example, hexamethylphosphoramide (HMPA) or 1,3-dimethyl-3,4,5,6-tetrahydro-2(1H)-pyrimidinone (DMPU).

Figure 2:
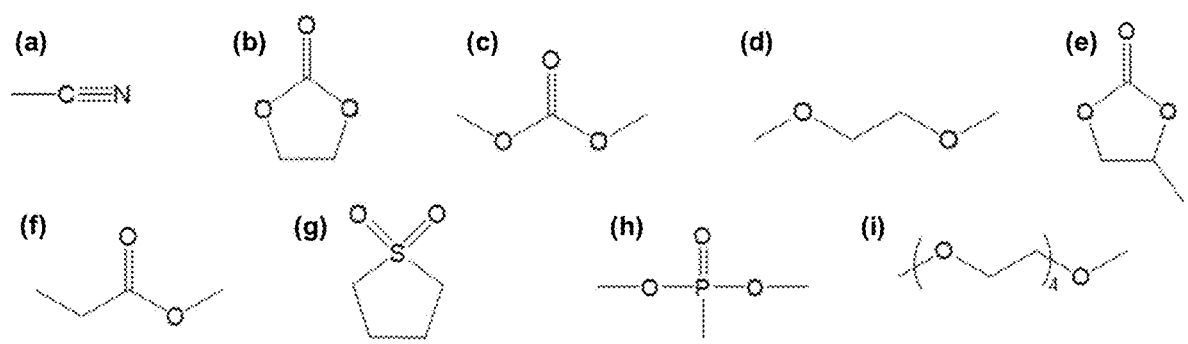
FIG. 2. Structures of a few specific examples of solvents: (a) acetonitrile, (b) ethylene carbonate, (c) dimethyl carbonate, (d) 1,2-dimethoxyethane, (e) propylene carbonate (PC), (f) methyl propionate, (g) tetramethylene sulfone, (h) dimethyl methylphosphonate, and (i) tetraethylene glycol dimethyl ether (TEGDME).

In some embodiments, any one or more classes or specific types of solvents are excluded from the solid polymer electrolyte. In other embodiments, a combination of two or more solvents, selected from any of the above solvents, are included in the solid polymer electrolyte, provided that the solvents in the mixture are miscible and compatible. Some particular solvents are shown in FIG. 2. In FIG. 2, solvent (a) is acetonitrile, solvent (b) is ethylene carbonate, solvent (c) is dimethyl carbonate, solvent (d) is 1,2-dimethoxyethane, solvent (e) is methyl propionate, solvent (f) is tetramethylene sulfone, and solvent (g) is dimethyl methylphosphonate.

A solvent additive may or may not also be included in the electrolyte. If present, the solvent additive should typically facilitate formation of a solid electrolyte interphase (SEI) on the anode. The solvent additive can be, for example, a solvent that possesses one or more unsaturated groups containing a carbon-carbon double bond and/or one or more halogen atoms. Some particular examples of solvent additives include vinylene carbonate (VC), vinyl ethylene carbonate, allyl ethyl carbonate, vinyl acetate, divinyl adipate, acrylic acid nitrile, 2-vinyl pyridine, maleic anhydride, methyl cinnamate, ethylene carbonate, halogenated ethylene carbonate, bromobutyrolactone, methyl chloroformate, and sulfite additives, such as ethylene sulfite (ES), propylene sulfite (PS), and vinyl ethylene sulfite (VES). In other embodiments, the additive is selected from 1,3-propanesultone, ethylene sulfite, propylene sulfite, fluoroethylene sulfite (FEC), α-bromo-γ-butyrolactone, methyl chloroformate, t-butylene carbonate, 12-crown-4 ether, carbon dioxide ($CO_2$), sulfur dioxide ($SO_2$), sulfur trioxide ($SO_3$), acid anhydrides, reaction products of carbon disulfide and lithium, and polysulfide. The additive is generally included in an amount that effectively impacts SEI formation without reducing the electrochemical window by an appreciable extent, typically below about 5.0 V. The additive may be included in an amount of, for example, 0.1, 0.5, 1, 2, 3, 4, 5, or 10 wt % by weight of the solid polymer electrolyte, or an amount within a range bounded by any two of the foregoing exemplary values. In some embodiments, any one or more of the above disclosed additives is excluded. Any of the foregoing additives may, in some embodiments, serve as the solvent itself, i.e., component (ii).

Component (iii), the metal salt dissolved in the solvent, contains a second metal ion associated with an anion, provided that the first metal ion (ionically associated with the anionic pendant group of the organic polymer) and second metal ion (in the metal salt dissolved in the solvent) are the same. The second metal ion (i.e., metal ion in the salt) may be selected from any of the first metal ions, i.e., lithium, sodium, potassium, magnesium, calcium, zinc, and aluminum ions. The anion in the metal salt may or may not overlap in structure with the anionic group in the organic polymer. The metal salt is dissolved in the solvent in a molar concentration of at least 0.05 M and up to 1.5 M. In different embodiments, the metal salt is present in the solvent in a molar concentration of 0.05 M, 0.1 M, 0.25 M, 0.3 M, 0.4 M, 0.5 M, 0.6 M, 0.7 M, 0.8 M, 0.9 M, 1 M, 1.1 M, 1.2 M, 1.3 M, 1.4 M, or 1.5 M, or a molar concentration within a range bounded by any two of the foregoing concentrations (e.g., 0.05-1.5 M, 0.1-1.5 M, 0.25-1.5 M, 0.5-1.5 M, 0.05-1.25 M, 0.1-1.25 M, 0.25-1.25 M, 0.5-1.25 M, 0.05-1 M, 0.1-1 M, 0.25-1 M, or 0.5-1 M).

The anion of the metal salt of component (iii) may be any anion, provided it is compatible with a battery and permits the metal salt to be completely dissolved in the solvent within a desired concentration range as provided earlier above. The anion may be inorganic or organic. Some examples of inorganic counteranions include the halides (e.g., chloride, bromide, or iodide), fluorosulfonimide ($(FSO_2)_2N^-$), hexafluorophosphate ($PF_6^-$), hexachlorophosphate ($PCl_6^-$), perchlorate, chlorate, chlorite, perbromate, bromate, bromite, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates. Organic anions include one or more hydrocarbon groups, which may or may not be fluorinated. Some examples of organic anions include the alkylsulfonimides (including fluoroalkylsulfonylimides, e.g., $(CF_3SO_2)_2N^-$), carboxylates (e.g., formate, acetate, propionate, butyrate, valerate, lactate, pyruvate, oxalate, malonate, glutarate, adipate, decanoate, and the like), fluorocarboxylates (e.g., trifluoroacetate and pentafluoropropionate), sulfonates (e.g., $CH_3SO_3^-$, $CH_3CH_2SO_3^-$, $CH_3(CH_2)_2SO_3-$, benzenesulfonate, toluenesulfonate, dodecylbenzenesulfonate, and the like), fluorosulfonates (e.g., $CF_3SO_3^-$, $CF_3CF_2SO_3^-$, $CF_3(CF_2)_2SO_3^-$, $CHF_2CF_2SO_3^-$, and the like), organoborates (e.g., $BR_1R_2R_3R_4^-$, wherein $R_1$, $R_2$, $R_3$, $R_4$ are typically hydrocarbon groups containing 1 to 6 carbon atoms), dicyanamide (i.e., $N(CN)_2^-$), phosphates, phosphonates (e.g., methyl phosphonate), and the phosphinates (e.g., bis-(2,4,4-trimethylpentyl)-phosphinate). In some embodiments, any one or more classes or specific types of anions, as provided above, are excluded from the solid electrolyte composition.

In particular embodiments, the anion of the metal salt of component (iii) is a fluoroalkylsulfonamide or fluoralkylsulfonate according to the following general formula:

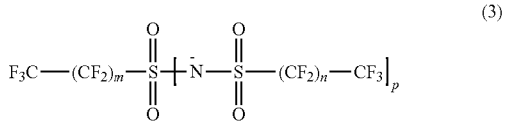

(3)

In Formula (3) above, subscripts m and n are independently 0 or an integer of 1 or above, as defined earlier above. Subscript p is 0 or 1. When p is 1, Formula (3) is directed to fluoroalkylsulfonamide anions. When p is 0, the group —N—SO$_2$—(CF$_2$)$_n$CF$_3$ subtended by p is replaced with an oxide atom connected to the sulfur atom (S) to result in fluoralkylsulfonate anions.

In one embodiment of Formula (3), subscript p is 1, so that Formula (3) reduces to the following chemical formula, directed to fluoroalkylsulfonamide compounds:

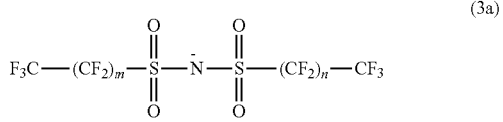

(3a)

In one embodiment of Formula (3a), m and n are the same, thereby resulting in a symmetrical anion. In another embodiment of Formula (3a), m and n are not the same, thereby resulting in an asymmetrical anion.

In a first set of embodiments of Formula (3a), m and n are independently at least 0 and up to 1, 2, 3, 4, 5, 6, 7, 8, 9, 10, or 11. When m and n are both 0, the resulting anion has the formula F$_3$CSO$_2$NSO$_2$CF$_3^-$, i.e., bis-(trifluoromethylsulfonyl)imide, or Tf$_2$N$^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include F$_3$CSO$_2$NSO$_2$CF$_2$CF$_3^-$, F$_3$CSO$_2$NSO$_2$(CF$_2$)$_2$CF$_3^-$, F$_3$CSO$_2$NSO$_2$(CF$_2$)$_3$CF$_3^-$, F$_3$CSO$_2$NSO$_2$(CF$_2$)$_4$CF$_3^-$, F$_3$CSO$_2$NSO$_2$(CF$_2$)$_5$CF$_3^-$, and so on.

In a second set of embodiments of Formula (3a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include N[SO$_2$CF$_2$CF$_3$]$_2^-$ (i.e., "BETI$^-$"), F$_3$CF$_2$CSO$_2$NSO$_2$(CF$_2$)$_2$CF$_3^-$, F$_3$CF$_2$CSO$_2$NSO$_2$(CF$_2$)$_3$CF$_3^-$, F$_3$CF$_2$CSO$_2$NSO$_2$(CF$_2$)$_4$CF$_3^-$, F$_3$CF$_2$CSO$_2$NSO$_2$(CF$_2$)$_5$CF$_3^-$, and so on.

In a third set of embodiments of Formula (3a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include N[SO$_2$(CF$_2$)$_2$CF$_3$]$_2^-$, F$_3$C(F$_2$C)$_2$SO$_2$NSO$_2$(CF$_2$)$_3$CF$_3^-$, F$_3$C(F$_2$C)$_2$SO$_2$NSO$_2$(CF$_2$)$_4$CF$_3^-$, F$_3$C(F$_2$C)$_2$SO$_2$NSO$_2$(CF$_2$)$_5$CF$_3^-$, and so on.

In a fourth set of embodiments of Formula (3a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include N[SO$_2$(CF$_2$)$_3$CF$_3$]$_2^-$, F$_3$C(F$_2$C)$_3$SO$_2$NSO$_2$(CF$_2$)$_4$CF$_3^-$, F$_3$C(F$_2$C)$_3$SO$_2$NSO$_2$(CF$_2$)$_5$CF$_3^-$, F$_3$C(F$_2$C)$_3$SO$_2$NSO$_2$(CF$_2$)$_6$CF$_3^-$, F$_3$C(F$_2$C)$_3$SO$_2$NSO$_2$(CF$_2$)$_7$CF$_3^-$, and so on.

In a fifth set of embodiments of Formula (3a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include N[SO$_2$(CF$_2$)$_4$CF$_3$]$_2^-$, F$_3$C(F$_2$C)$_4$SO$_2$NSO$_2$(CF$_2$)$_5$CF$_3^-$, F$_3$C(F$_2$C)$_4$SO$_2$NSO$_2$(CF$_2$)$_6$CF$_3^-$, F$_3$C(F$_2$C)$_4$SO$_2$NSO$_2$(CF$_2$)$_7$CF$_3^-$, F$_3$C(F$_2$C)$_4$SO$_2$NSO$_2$(CF$_2$)$_8$CF$_3^-$, and so on.

In a sixth set of embodiments of Formula (3a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include N[SO$_2$(CF$_2$)$_5$CF$_3$]$_2^-$, F$_3$C(F$_2$C)$_5$SO$_2$NSO$_2$(CF$_2$)$_6$CF$_3^-$, F$_3$C(F$_2$C)$_5$SO$_2$NSO$_2$(CF$_2$)$_7$CF$_3^-$, F$_3$C(F$_2$C)$_5$SO$_2$NSO$_2$(CF$_2$)$_8$CF$_3^-$, F$_3$C(F$_2$C)$_5$SO$_2$NSO$_2$(CF$_2$)$_9$CF$_3^-$, and so on.

In a seventh set of embodiments of Formula (3a), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include N[SO$_2$(CF$_2$)$_6$CF$_3$]$_2^-$, F$_3$C(F$_2$C)$_6$SO$_2$NSO$_2$(CF$_2$)$_7$CF$_3^-$, F$_3$C(F$_2$C)$_6$SO$_2$NSO$_2$(CF$_2$)$_8$CF$_3^-$, F$_3$C(F$_2$C)$_6$SO$_2$NSO$_2$(CF$_2$)$_9$CF$_3^-$, F$_3$C(F$_2$C)$_6$SO$_2$NSO$_2$(CF$_2$)$_{10}$CF$_3^-$, and so on.

In other embodiments of Formula (3a), m abides by one or a number of alternative conditions set forth in one of the foregoing seven embodiments while n abides by one or a number of alternative conditions set forth in another of the foregoing seven embodiments.

In an alternative embodiment of Formula (3), subscript p is 0, in which case Formula (3) reduces to the following chemical formula, directed to fluoralkylsulfonate anions:

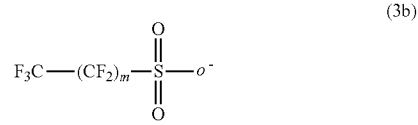

(3b)

In different exemplary embodiments of Formula (3b), m can be: 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include F$_3$CSO$_3^-$ (i.e., "triflate" or "TfO$^-$"), F$_3$CF$_2$CSO$_3^-$, F$_3$C(F$_2$C)$_2$SO$_3^-$, F$_3$C(F$_2$C)$_3$SO$_3^-$ (i.e., "nonaflate" or "NfO$^-$"), F$_3$C(F$_2$C)$_4$SO$_3^-$, F$_3$C(F$_2$C)$_5$SO$_3$—, F$_3$C(F$_2$C)$_6$SO$_3^-$, F$_3$C(F$_2$C)$_7$SO$_3^-$, F$_3$C(F$_2$C)$_8$SO$_3^-$, F$_3$C(F$_2$C)$_9$SO$_3^-$, F$_3$C(F$_2$C)SO$_3^-$, F$_3$C(F$_2$C)$_{11}$SO$_3^-$, and so on.

Figure 3:
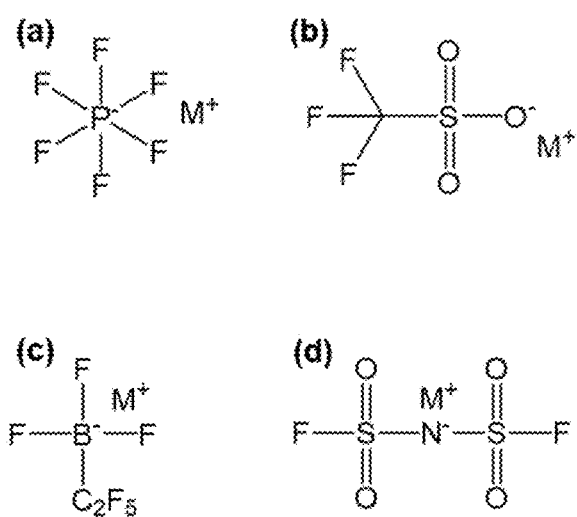
FIG. 3. Structures of a few specific examples of metal salts, where $M^+$=an alkali metal or organic cation. (a) pentafluorophosphate, (b) trifluoromethane sulfonate, (c) perfluoroethyl trifluoroborate, and (d) bis(fluorosulfonyl) imide.

The structures of a few exemplary metal salts are shown in FIG. 3, wherein M$^+$ represents a second metal ion, such as any of those provided above, particularly an alkali metal ion. In FIG. 3, species (a) is a hexafluorophosphate salt, species (b) is a trifluoromethylsulfonate salt, species (c) is a perfluoroethyl trifluoroborate metal salt, and species (d) is a bis(fluorosulfonylimide) metal salt.

In some embodiments, any one or more classes or specific types of anions described above are excluded from the metal salt. In other embodiments, the metal salt includes a combination of anions, such as two or more of any of the anions described above.

Typically, the SPE composition described above is in the shape of a film. The produced film generally has a thickness of no more than or less than 200 microns. In different embodiments, the film has a thickness of about, up to, or less than, for example, 0.5, 1, 5, 10, 20, 25, 30, 40, 50, 60, 70, 80, 90, 100, 120, 150, 180, or 200 microns or a thickness within a range bounded by any two of the foregoing values (e.g., 0.5-200, microns, 0.5-100 microns, 0.5-50 microns, 0.5-30 microns, 0.5-25 microns, 0.5-20 microns, 1-50 microns, 1-30 microns, 1-25 microns, or 1-20 microns). In some embodiments, the film is substantially uniform, such as by having a roughness less than a micron or so.

The SPE composition described above may have exceptional mechanical properties, which may be evidenced by, for example, an exceptional Young's modulus, tensile strength, elongation at break, and/or storage modulus. The SPE composition may have a Young's modulus of at least, for example, 300, 325, 350, 375, 400, 425, 450, 475, or 500 MPa at 25° C. The SPE composition may have a tensile strength of at least, for example, 12, 14, 16, 18, or 20 MPa at 25° C. The SPE composition may have an elongation at break of precisely or at least, for example, 2, 5, 10, 15, 20, 25, 30, 40, 45, 50, 55, 60, 70, 80, 90, or 100%, or an elongation within a range bounded by any two of the foregoing values. The SPE composition may have a storage modulus of precisely or at least, for example, 200, 300, 400, 500, 1000, 1500, 2000, or 2500 MPa, or a storage modulus within a range bounded by any two of the foregoing values.

The SPE compositions described above typically have a conductivity of at least or above $1.0\times10^{-6}$ S/cm at 25° C. or 30° C. In different embodiments, the SPE composition has a conductivity of at least or above $1.0\times10^{-6}$ S/cm, $2.0\times10^{-6}$ S/cm, $3.0\times10^{-6}$ S/cm, $4.0\times10^{-6}$ S/cm, $5.0\times10^{-6}$ S/cm, $6.0\times10^{-6}$ S/cm, $7.0\times10^{-6}$ S/cm, $8.0\times10^{-6}$ S/cm, $9.0\times10^{-6}$ S/cm, $1.0\times10^{-5}$ S/cm, $2.0\times10^{-5}$ S/cm, $3.0\times10^{-5}$ S/cm, $4.0\times10^{-5}$ S/cm, $5.0\times10^{-5}$ S/cm, $6.0\times10^{-5}$ S/cm, $7.0\times10^{-5}$ S/cm, $8.0\times10^{-5}$ S/cm, $9.0\times10^{-5}$ S/cm, or $1.0\times10^{-4}$ S/cm at 25° C. or 30° C. The SPE compositions described above typically exhibit a transport number of at least 0.45, 0.5, 0.55, 0.6, 0.65, 0.7, 0.75, or 0.8.

In another aspect, the present disclosure is directed to a method for producing the SPE composition described above. Typically, a solution containing a desired concentration of the anion-tethered organic polymer (e.g., 1-10 wt %) in a solvent (i.e., component (ii), as described above) is cast into a mold or onto a flat or textured surface to form a film, followed by partial or complete evaporation of the solvent in the film to result in an initial polymer membrane. The initial polymer membrane can then undergo cation exchange to introduce the first metal ion. For example, to produce a lithium or sodium form of the polymer membrane, the initial polymer membrane can be soaked in an aqueous solution of LiOH or NaOH, respectively, for a sufficient time period (e.g., at least 12 or 24 hours), with optional replacement of the original aqueous solution with fresh aqueous solution to ensure complete incorporation (exchange) of lithium or sodium ions. The exchanged membrane may then be rinsed with deionized water and dried, typically under vacuum and/or elevated temperature (e.g., at least 30, 40, 50, 60, 70, or 80° C.) for a time period of at least 6, 12, or 24 hours. The exchanged membrane may then be soaked in an excess of electrolyte solution containing a desired concentration (e.g., 0.05-1.5 M) of the metal salt (e.g., as described earlier above, such as LiTf or NaTf) in a solvent (e.g., as described earlier above, such as TEGDME or PC).

In another aspect, the present disclosure is directed to batteries in which any of the above described SPE compositions is incorporated. The battery contains at least an anode, a cathode, and the solid electrolyte in contact with or as part of the anode and/or cathode. In some embodiments, the SPE is incorporated in the battery in the form of a film or membrane, as described above. In the battery, the SPE can have any of the compositions, any particular selections of components (i), (ii), and (iii), and film thicknesses described above. In some embodiments, the battery is a metal (plate) battery, in which the anode contains a film of metal (e.g., lithium metal anode). In other embodiments, the battery is a metal ion battery in which the anode contains metal ions stored in a base material (e.g., lithium ions intercalated in graphite). Whether the battery contains a metal anode or metal-ion anode, the battery may be a single-use (primary) or rechargeable (secondary) battery.

In a particular embodiment, the battery is a lithium-based single use or rechargeable battery. Any of the SPE compositions described above can be incorporated as a solid electrolyte in contact with at least one of the anode (negative electrode) and cathode (positive electrode) of the lithium metal or lithium-ion battery, provided that the first and second metal ions in the SPE composition are lithium ions. Alternatively, the SPE composition can be incorporated into a cathode of the battery (possibly admixed with a binder material), and the anode and cathode may be in contact with the above-described SPE composition or any of the conventional liquid (e.g., polar solvent or aqueous) or solid electrolytes known in the art. The lithium metal battery may contain any of the components typically found in a lithium metal battery, such as described in, for example, X. Zhang et al., *Chem. Soc. Rev.*, 49, 3040-3071, 2020; P. Shi et al., *Adv. Mater. Technol.*, 5(1), 1900806 (1-15), January 2020; and X.-B. Cheng et al., *Chem. Rev.*, 117, 15, 10403-10473 (2017), the contents of which are incorporated herein by reference. In some embodiments, the lithium metal battery contains molybdenum disulfide in the cathode. The lithium-ion battery may contain any of the components typically found in a lithium-ion battery, including positive (cathode) and negative (anode) electrodes, current collecting plates, a battery shell, such as described in, for example, U.S. Pat. Nos. 8,252,438, 7,205,073, and 7,425,388, the contents of which are incorporated herein by reference in their entirety. In some embodiments, the lithium-ion battery is more specifically a lithium-sulfur battery, as well known in the art, e.g., L. Wang et al., Energy Environ. Sci., 8, 1551-1558, 2015, the contents of which are herein incorporated by reference. In some embodiments, any one or more of the above noted components may be excluded from the battery.

In embodiments where the above described SPE composition is in contact with an anode and cathode of the lithium-based battery but not incorporated into the cathode, the positive (cathode) electrode can have any of the compositions well known in the art, for example, a lithium metal oxide, wherein the metal is typically a transition metal, such as Co, Fe, Ni, or Mn, or combination thereof, or manganese dioxide ($MnO_2$), iron disulfide ($FeS_2$), or copper oxide (CuO). In some embodiments, the cathode has a composition containing lithium, nickel, and oxide. In further embodiments, the cathode has a composition containing lithium, nickel, manganese, and oxide, or the cathode has a composition containing lithium, nickel, cobalt, and oxide. Some examples of cathode materials include $LiCoO_2$, $LiMn_2O_4$, $LiNiCoO_2$, $LiMnO_2$, $LiFePO_4$, $LiNiCoAlO_2$, and $LiNi_xMn_{2-x}O_4$ compositions, such as $LiNi_{0.5}Mn_{1.5}O_4$, the latter of which are particularly suitable as 5.0 V cathode materials, wherein x is a number greater than 0 and less than 2. In some embodiments, one or more additional elements may substitute a portion of the Ni or Mn. In some embodiments, one or more additional elements may substitute a portion of the Ni or Mn, as in $LiNi_xCo_{1-x}PO_4$, and $LiCu_xMn_{2-x}O_4$, materials (Cresce, A. V., et al., *Journal of the Electrochemical Society*, 2011, 158, A337-A342). In further specific embodiments, the cathode has a composition containing lithium, nickel, manganese, cobalt, and oxide, such as $LiNiMnCoO_2$ or a $LiNi_{w-y-z}Mn_yCo_zO_2$ composition (wherein w+y+z=1), e.g., $LiNi_{0.8}Mn_{0.1}Co_{0.1}O_2$. The cathode may alternatively have a layered-spinel integrated $Li[Ni_{1/3}Mn_{2/3}]O_2$ composition, as described in, for example, Nayak et al., *Chem. Mater.*, 2015, 27 (7), pp. 2600-2611. To improve conductivity at the cathode, conductive carbon material (e.g., carbon black, carbon fiber, or graphite) may be admixed with the positive electrode material. In some embodiments, any one or more of the above types of positive electrodes may be excluded from the battery.

In the lithium-based battery, the negative (anode) electrode may be lithium metal or a material in which lithium ions are contained and can flow. For lithium-ion batteries, the anode may be any of the carbon-containing and/or silicon-containing anode materials well known in the art of lithium-ion batteries. In some embodiments, the anode is a carbon-based composition in which lithium ions can intercalate or embed, such as elemental carbon, such as graphite (e.g., natural or artificial graphite), petroleum coke, carbon fiber (e.g., mesocarbon fibers), carbon (e.g., mesocarbon) microbeads, fullerenes (e.g., carbon nanotubes, i.e., CNTs), and graphene. The carbon-based anode is typically at least 70 80, 90, or 95 wt % elemental carbon. The silicon-containing composition, which may be used in the absence or presence of a carbon-containing composition in the anode, can be any of the silicon-containing compositions known in the art for use in lithium-ion batteries. Lithium-ion batteries containing a silicon-containing anode may alternatively be referred to as lithium-silicon batteries. The silicon-containing composition may be, for example, in the form of a silicon-carbon (e.g., silicon-graphite, silicon-carbon black, silicon-CNT, or silicon-graphene) composite, silicon microparticles, or silicon nanoparticles, including silicon nanowires. The negative electrode may alternatively be a metal oxide, such as tin dioxide ($SnO_2$), titanium dioxide ($TiO_2$), or lithium titanate (e.g., $Li_2TiO_3$ or $Li_4Ti_5O_{12}$), or a composite of carbon and a metal oxide. In other embodiments, the anode may be composed partially or completely of a suitable metal or metal alloy (or intermetallic), such as tin, tin-copper alloy, tin-cobalt alloy, or tin-cobalt-carbon intermetallic. In some embodiments, any one or more of the above types of negative electrodes may be excluded from the battery.

In another particular embodiment, the battery is a sodium metal or sodium-ion battery in which any of the SPE compositions described above can be incorporated, either in contact with or as part of the anode and/or cathode. Any of the SPE compositions described above can be incorporated as a solid electrolyte in contact with the anode (negative electrode) and cathode (positive electrode) of the sodium-based battery, provided that the first and second metal ions in the SPE composition are sodium ions. Alternatively, the SPE composition can be incorporated into a cathode of the battery (possibly admixed with a binder material), and the anode and cathode may be in contact with the above-described SPE composition or any of the conventional liquid (e.g., polar solvent or aqueous) or solid electrolytes known in the art. Sodium metal batteries are well known in the art, such as described in, for example, H. Sun et al., *Nature Communications*, 10, 3302, 2019, the contents of which are herein incorporated by reference. Sodium-ion batteries are also well known in the art, such as described in, for example, U.S. Application Publication No. 2012/0021273, and B. L. Ellis, et al., *Current Opinion in Solid State and Materials Science*, 16, 168-177, 2012, the contents of which are herein incorporated by reference in their entirety. In embodiments where the SPE composition is in contact with an anode and cathode of the sodium-based battery but not incorporated into the cathode, the sodium-based battery may employ, for example, a sodium inorganic material as the active material in the cathode. Some examples of sodium inorganic materials include, for example, $NaFeO_2$, $NaMnO_2$, $NaNiO_2$, and $NaCoO_2$. Other cathode materials for sodium-based batteries include transition metal chalcogenides, such as described in U.S. Pat. No. 8,906,542, and sodium-lithium-nickel-manganese oxide materials, such as described in U.S. Pat. No. 8,835,041, the contents of which are herein incorporated by reference in their entirety.

In another embodiment, the battery is a magnesium or calcium metal battery or Mg-ion or Ca-ion battery in which any of the SPE compositions described above can be incorporated, either in contact with or as part of the anode and/or cathode, provided that the first and second metal ions in the SPE composition are both Mg ions or Ca ions. In the Mg-based or Ca-based battery, the SPE composition can be incorporated as a solid electrolyte in contact with the anode (negative electrode) and cathode (positive electrode) of the Mg-based or Ca-based battery. Alternatively, the SPE composition can be incorporated into a cathode of the battery (possibly admixed with a binder material), and the anode and cathode may be in contact with the above-described SPE composition or any of the conventional liquid (e.g., polar solvent or aqueous) or solid electrolytes known in the art.

Magnesium metal batteries are well known in the art, such as described in, for example, S.-B. Son et al., *Nature Chemistry*, 10, 532-539, 2018, the contents of which are herein incorporated by reference. Magnesium-ion batteries are also well known in the art, such as described in, for example, M. M. Huie, et al., *Coordination Chemistry Reviews*, vol. 287, pp. 15-27, March 2015; S. Tepavcevic, et al., *ACS Nano*, DOI: 10.1021/acsnano.5b02450, Jul. 14, 2015; *Beilstein J. Nanotechnol.*, 5, 1291-1311, 2014; and U.S. Pat. No. 9,882,245, the contents of which are herein incorporated by reference in their entirety. The magnesium battery may contain any of the components typically found in a magnesium battery, including cathode (positive) and anode (negative) electrodes, current collecting plates, and a battery shell, such as described in, for example, U.S. Pat. Nos. 8,361,661, 8,722,242, 9,012,072, and 9,752,245, the contents of which are incorporated herein by reference in their entirety. The positive electrode can include, as an active material, for example, a transition metal oxide or transition metal sulfide material, such as the composition $M_xMo_6T_8$, wherein M is at least one metal selected from alkaline earth and transition metals, T is selected from at least one of sulfur, selenium, and tellurium, and x is a value of 0 to 2. The negative electrode is generally a magnesium-containing electrode, which may include magnesium in elemental or divalent form. In elemental form, the magnesium may be either in the absence of other metals (i.e., substantially or completely pure magnesium, except for a possible trace of other metals, e.g., up to 1, 0.5, or 0.1 wt %) or in the form of a magnesium alloy, e.g., AZ31, AZ61, AZ63, AZ80, AZ81, ZK51, ZK60, ZC63, or the like. In some embodiments, the negative electrode can be or include a magnesium intercalation material, which may, before operation, not yet include magnesium intercalated therein. Some examples of magnesium intercalation materials include any of the materials described above for the positive electrode, anatase or rutile $TiO_2$, $FeS_2$, $TiS_2$, or $MoS_2$. Ca-ion batteries are also known in the art, such as described in Md. Adil et al., *ACS Appl. Mater. Interfaces*, 12(10), 11489-11503, 2020, the contents of which are herein incorporated by reference.

Zinc metal batteries are known in the art, such as described in, for example, F. Wang et al., *Nature Materials*, 17, 543-549, 2018, the contents of which are herein incorporated by reference. Zinc-ion batteries are also known in the art, such as described, for example, in U.S. Pat. No. 8,663,844 and B. Lee et al., *Scientific Reports*, 4, article no. 6066 (2014), the contents of which are herein incorporated by reference. The cathode can include, for example, a composition based on manganese dioxide, and the anode may be zinc or zinc alloy. In the zinc-based battery, any of the SPE compositions described above can be incorporated as a solid electrolyte in contact with the anode (negative electrode) and cathode (positive electrode) of the zinc-based battery, provided that the first and second metal ions in the SPE composition are zinc ions. Alternatively, any of the SPE compositions described above can be incorporated into a cathode of the zinc-based battery (typically admixed with a binder material), and the anode and cathode may be in contact with the above-described SPE composition or any of the conventional liquid (e.g., polar solvent or aqueous) or solid electrolytes known in the art.

The battery may also be an aluminum metal or aluminum-ion battery. Aluminum-ion batteries are known in the art, such as described, for example, in U.S. Pat. No. 6,589,692 and WO 2013/049097, the contents of which are herein incorporated in their entirety. The cathode can include, for example, a graphitic, manganese oxide (e.g., $Mn_2O_4$), or vanadium oxide material cathode, and the anode may be aluminum or aluminum alloy. In the case of an Al-ion battery, any of the SPE compositions described above can be incorporated as a solid electrolyte in contact with the anode (negative electrode) and cathode (positive electrode) of the Al-ion battery, provided that the first and second metal ions in the SPE composition are aluminum ions. Alternatively, any of the SPE compositions described above can be incorporated into a cathode of the Al-ion battery (typically admixed with a binder material), and the anode and cathode may be in contact with the above-described SPE composition or any of the conventional liquid (e.g., polar solvent or aqueous) or solid electrolytes known in the art. The battery may analogously be a copper-based or silver-based battery, in which case Cu-containing or Ag-containing SPE compositions can be incorporated as a solid electrolyte in the battery.

In some embodiments, the negative (anode) electrode of the battery may be a carbon-based composition in which alkali or other ions can be stored (e.g., intercalated or embedded), such as elemental carbon, or more particularly graphite (e.g., natural or artificial graphite), petroleum coke, carbon fiber (e.g., mesocarbon fibers), or carbon (e.g., mesocarbon) microbeads. The anode may be at least 70 80, 90, or 95 wt % elemental carbon. The negative electrode may alternatively be a metal oxide, such as tin dioxide ($SnO_2$) or titanium dioxide ($TiO_2$), or a composite of carbon and a metal oxide.

The positive and negative electrode compositions may be admixed with an adhesive (e.g., PVDF, PTFE, and copolymers thereof) in order to be properly molded as electrodes. Typically, positive and negative current collecting substrates (e.g., Cu or Al foil) are also included. The SPE composition is typically incorporated in the form of a film having any of the thicknesses described earlier above. The film of solid electrolyte is typically made to be in contact with at least one (more typically both) of the electrodes. The assembly and manufacture of lithium-based batteries are well known in the art.

Examples have been set forth below for the purpose of illustration and to describe certain specific embodiments of the invention. However, the scope of this invention is not to be in any way limited by the examples set forth herein.

EXAMPLES

Overview

A commercially available midblock sulfonated pentablock copolymer (Nexar™ MD-9200) was selected as a base polymer due to its high mechanical strength and capability to form microphase-separated morphology. The superior mechanical strength permits stable thin membranes to be fabricated. The midblock of the copolymer was converted from a sulfonate functional group to a TFSI functional group via a facile two-step process, depicted schematically in FIG. 4. The tethered anion aids in restricting the mobility of free anions, thereby permitting a high cation transport number to be maintained. Propylene carbonate (PC) and tetraethylene glycol dimethyl ether (TEGDME) were selected as solvents. These solvents are of similar viscosity (~3.3 mPa s), and widely differing dielectric constant (c) ($\varepsilon_{pc}$=65, $\varepsilon_{TEGDME}$=7.8) (Tang et al., *RSC Adv.*, 4(22), 11251-11287, 2014). Sodium triflate (NaTf) was selected as the salt in view of its solubility in glyme solvents and demonstrated compatibility with highly reactive redox species (E. C. Self et al., *ACS Energy Lett.* 4(11), 2593-2600, 2019). Membrane properties, such as uptake, conductivity, transport number, and salt absorption were measured as a function of electrolyte salt concentration to determine the relationships between membrane transport and electrolyte. The results of this study provide important design parameters for the advancement of high-performance non-aqueous energy-storage technologies.

Synthesis and Fabrication of TFSI Na Membranes

The Nexar™ polymer was dried from the as-received cyclohexane solution and washed with deionized water to remove any residual impurities from polymerization. For conversion to sulfonyl chloride form, 3 g (6.0 mmol $SO_3$) of polymer was dissolved in THF (100 mL). A catalytic amount of DMF was added (0.60 ml, 7.7 mmol), and the solution cooled to 0° C. Thionyl chloride (1.8 ml, 24 mmol) was added dropwise, and the polymer solution was kept at 0° C. for 1 hour, then reacted at room temperature for 6 hours under an argon atmosphere. The polymer solution was stored in the freezer overnight before precipitating into ice water. The polymer was collected via vacuum filtration and washed several times with cold water, then dried under vacuum at 50° C. for 48 hours. The obtained product was a white fluffy polymer. The TFSI functionalized polymer was prepared by dissolving the sulfonyl chloride intermediate in THF (100 mL) and purging with argon. The solution was cooled to 0° C. before TFSA (1.8 g, 12 mmol) and TEA (2.8 ml, 20 mmol) in 5 mL of THF were added dropwise. The reaction proceeded at 0° C. for 1 hour, then room temperature for 3 hour. The solution was chilled in the freezer before precipitating into ice water. The resulting light brown polymer was collected via vacuum filtration and dried at 65° C. for 24 hours. Conversion to TFSI (H) form was confirmed by elemental analysis (C=54.7 mmol/g, N=1.77 mmol/g, H=84.2 mmol/g).

The sulfonate membranes were fabricated by casting a 3 wt % polymer in 3:1 THF/DMF solution into a Teflon® evaporating dish. The solvent was slowly evaporated, followed by drying under vacuum at 65° C. overnight. The membranes were exchanged to sodium form by soaking in a 1 M NaOH aqueous solution for 24 hours. The solution was replaced with fresh NaOH aqueous solution three times. The membranes were rinsed well with deionized water and dried under vacuum at 65° C. for 24 hours. To prepare the TFSI membranes, the polymer was converted to $Na^+$ or $H^+$ form first, then cast using the same procedure as above. The membranes were approximately 50 µm thick.

Membrane Characterizations

Small-angle x-ray scattering (SAXS) was performed using a system with dual-source Cu and Mo x-ray beam (50 kV, 0.60 mA, λ=0.154 nm). The sample to detector distance was 900 mm. The samples were probed for 15 min, with scattering information collected with a triple-axis 300K detector. The q range scanned was 0.004 to 3.2 $nm^{-1}$. The glass transition temperature ($T_g$) of the membranes was determined by dynamic mechanical analysis (DMA). Samples of 15×5 mm in size were measured in tensile mode at an operating frequency of 1 Hz and heated at a rate of 10° C./min from −80 to 250° C. The $T_g$ of the membranes was recorded from the loss modulus peaks. Differential scanning calorimetry (DSC) was used as an additional method to determine the $T_g$ of the ethylene/propylene block. Samples were prepared in an argon-filled glovebox and heated at a rate of 10° C./min from −90 to 120° C. for 1 cycle, then from −90 to 200° C. for 1 cycle. The $T_g$ was recorded from the second heating cycle. The decomposition temperatures of the dry membranes were determined by thermal gravimetric analysis. TGA was conducted under nitrogen at a heating rate of 20° C./min, with the thermal decomposition temperature ($T_d$) measured at 5% mass loss. The tensile strength of the membranes was measured using a universal tensile meter according to ASTM D1708. Membranes were stretched at a constant rate of 1 mm/min under ambient conditions until break.

The electrolyte uptake of the membranes soaked in the various electrolyte solutions was determined using the following equation:

$$\text{Uptake (\%)} = \frac{m_w - m_d}{m_d} \times 100$$

where $m_w$ is the mass of the polymer after soaking in the electrolyte solution and $m_d$ is the mass of the dry polymer. The amount of salt absorbed into the membranes was determined using inductively coupled plasma optical emission spectroscopy (ICP-OES). Electrolyte equilibrated membranes were dried to remove the residual organic solvent, then heated overnight in a known volume of 1 M nitric acid to transfer the salt into the aqueous phase. The moles of $Tf^-$ in the aqueous solutions were determined by measuring the concentration of sulfur against analytical standards.

Electrochemical Characterizations

Samples for electrochemical measurements were prepared in a glovebox and equilibrated in the various solutions for at least three days. Tests were performed using a potentiostat and suitable software. Electrochemical impedance measurements were performed by a direct contact method (J. Kamcev et al., *J. Membrane Sci.*, 547, 123-133, 2018). Samples were sealed between two stainless-steel blocking electrodes, and the impedance was measured while heating from 25 to 60° C. and cooling from 60 to 20° C. A frequency range of 1 MHz-1 Hz was used, with a 6 mV AC signal. The $Na^+$ transport number was determined by the Bruce-Vincent polarization method (J. Evans., Polymer, 28(13), 2324-2328, 1987). The equilibrated membranes were sandwiched between sodium foil and sealed. A 10 mV DC potential was applied, with the current monitored over 10 hours at 50° C. Electrochemical impedance was measured just before the potential was applied and at 10 hours. The cation transport number ($t_+$) is determined using the following equation, $$t_+ = \frac{I_{ss}(\Delta V - I_0 R_0)}{I_0(\Delta V - I_s R_{ss})}$$

where $R_0$ and $R_{ss}$ are the initial and steady-state interfacial resistances, $I_0$ and $I_{ss}$ are the initial and steady-state current, and $\Delta V$ is the applied potential.

Results and Discussion

Figure 4:
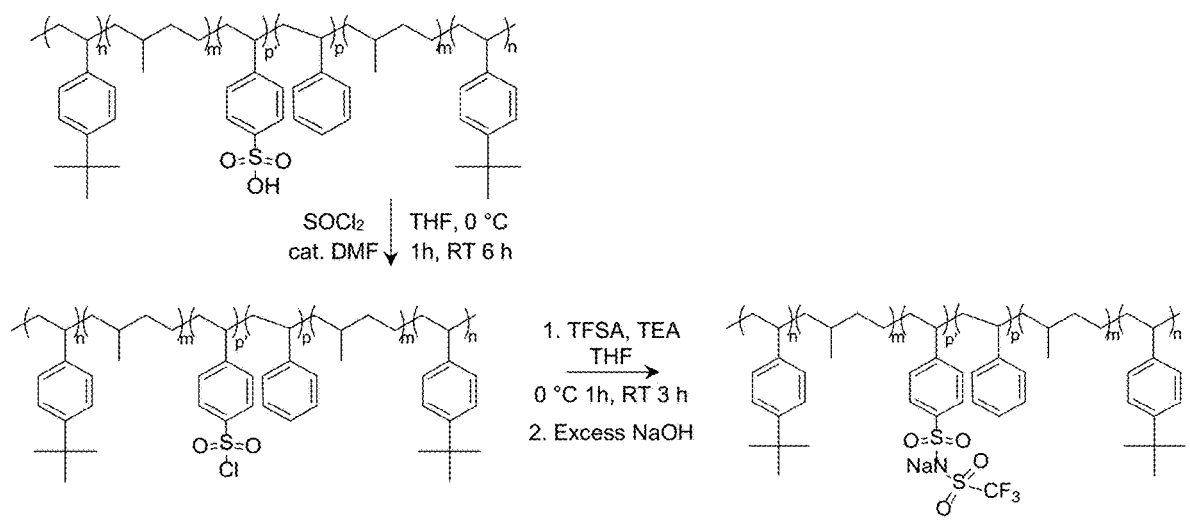
FIG. 4. Scheme showing synthesis of a trifluoromethanesulfonimide (TFSI) functionalized pentablock copolymer from the sulfonic acid functionalized base polymer, Nexar™.

The pentablock terpolymer, poly[t-butyl styrene-b-(ethylene-r-propylene)-b-(styrene-co-styrenesulfonate)-b-(ethylene-r-propylene)-b-t-butyl styrene], (Nexar™, MD-9200) was selected for this study due to its ability to form microphase-separated ionic domains, a mechanically robust backbone, and availability in sulfonated form. MD-9200 has an ion exchange capacity (IEC) of 2.0 meq/g in acid form ($H^+$) (structure shown in FIG. 4). The ethylene-r-propylene blocks may also be referred to as ethylene-alt-propylene blocks, or, more simply, isoprene blocks. The polymer combines a rigid poly(t-butyl styrene) outer block for mechanical support, a flexible low $T_g$ poly(ethylene-r-propylene) inner block, and a sulfonated polystyrene ionic center block (FIG. 4). In addition to providing mechanical rigidity, the t-butyl styrene structure also prevents sulfonation of the outer block, thereby permitting selective sulfonation of the center block (T. Saito et al., *Macromolecules*, 41(10), 3503-3512, 2008.

The original sulfonic acid group was converted to a TFSI functional group via a two-step process. The polymer was reacted with thionyl chloride to form the sulfonyl chloride intermediate. The sulfonyl chloride intermediate was then reacted with trifluoromethanesulfonamide to form the styrene TFSI functional group (scheme shown in FIG. 4). The polymer was then exchanged to sodium form to provide a sodium-ion conducting membrane. The IEC of the sodium sulfonate pentablock polymer is 1.9 meq/g, and the sodium TFSI polymer is 1.6 meq/g. Membranes were cast from a 3:1 THF/DMF solvent mixture, thoroughly dried, and transferred to a glove box for plasticization. Plasticization was achieved by equilibrating pieces of membrane in an excess of electrolyte solution containing 0 to 1 M NaTf in either TEGDME or PC.

The neat pentablock copolymer, MD-9200, in sulfonic acid form, exhibits microphase separation into various morphologies depending on the casting solvent. For example, it has been reported that MD-9200 cast from cyclohexane exhibits a disordered structure, while utilization of THF as the casting solvent produces membranes with a lamellar/hexagonal morphology (F. Huang et al., *J. Membrane Sci.*, 545, 1-10, 2018). The proton transport of the membranes increased from 4.5 to 47.8 mS/cm (25° C. in water) with the change in casting solvent from cyclohexane to THF. The effect of incrementally increasing the casting solvent polarity using toluene/n-propanol mixtures has also been studied (P. V. Truong et al., *ACS Applied Polymer Materials*, 1(1), 8-17, 2018). With 29 wt % n-propanol, the membranes exhibited a highly ordered lamellar morphology with multiple peaks at higher q in small-angle x-ray scattering (SAXS). When the solvent mixture reached 40 wt % n-propanol, membrane morphology switched to a disordered lamellar structure that was more favorable for proton transport under moderate humidity conditions. Proton conductivity increased from 0.004 to 0.015 mS/cm (25° C., 52% relative humidity) with an increase in n-propanol in the casting solution from 29 wt % to 40 wt %.

Figure 5:
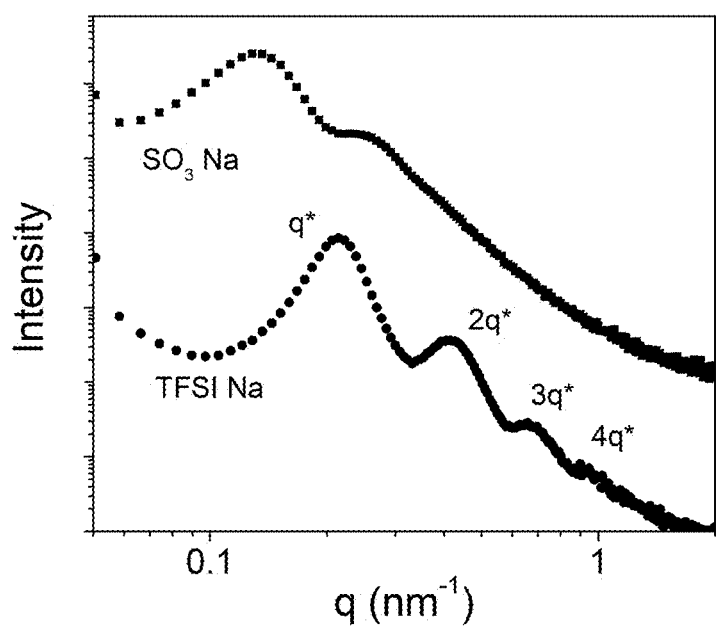
FIG. 5. Small-angle x-ray scattering (SAXS) profiles for sodium sulfonate and TFSI pentablock copolymer membranes.

Here, the morphology of the SO₃Na and TFSI Na pentablock copolymer membranes cast from the same solvent mixture were compared, and the results are shown in FIG. 5. FIG. 5 shows SAXS profiles for sodium sulfonate and TFSI pentablock copolymer membranes. As shown in FIG. 5, the primary q for the sulfonated membrane occurs at a lower value (0.136 nm$^{-1}$) than that of the TFSI membrane (0.214 nm$^{-1}$), which indicates a larger feature size. The SAXS profile of the SO₃Na membrane is similar to that of MD-9200-SO₃H cast from THF, which indicates that the polar solvent DMF in the casting solution had minimal effect on membrane morphology, unlike alcoholic co-solvents as mentioned above. Both membranes show a distinct primary peak with additional peaks at higher q values. The scattering patterns of both membranes indicate the presence of lamellar morphology. The appearance of the additional peaks of 3q* and 4q* observed for the TFSI membrane indicate longer-range order. The corresponding domain spacing, $d_1=2\pi/q^*$, of the SO₃Na membrane and the TFSI Na membrane was found to be 48.9 nm and 29.3 nm, respectively. The obtained domain spacing for the sodium sulfonate membrane is slightly larger than that reported for the sulfonate membrane in proton form (43-44 nm) (e.g., F. Huang et al., supra.). The smaller domain size of the TFSI membrane indicates that the TFSI anion permits the ionic regions to be more densely packed, thereby possibly increasing the available percolating pathways for ion transport (M. Chintapalli et al., *Macromolecules*, 47 (15), 5424-5431, 2014).

Figures 6A, 6B, 6C:
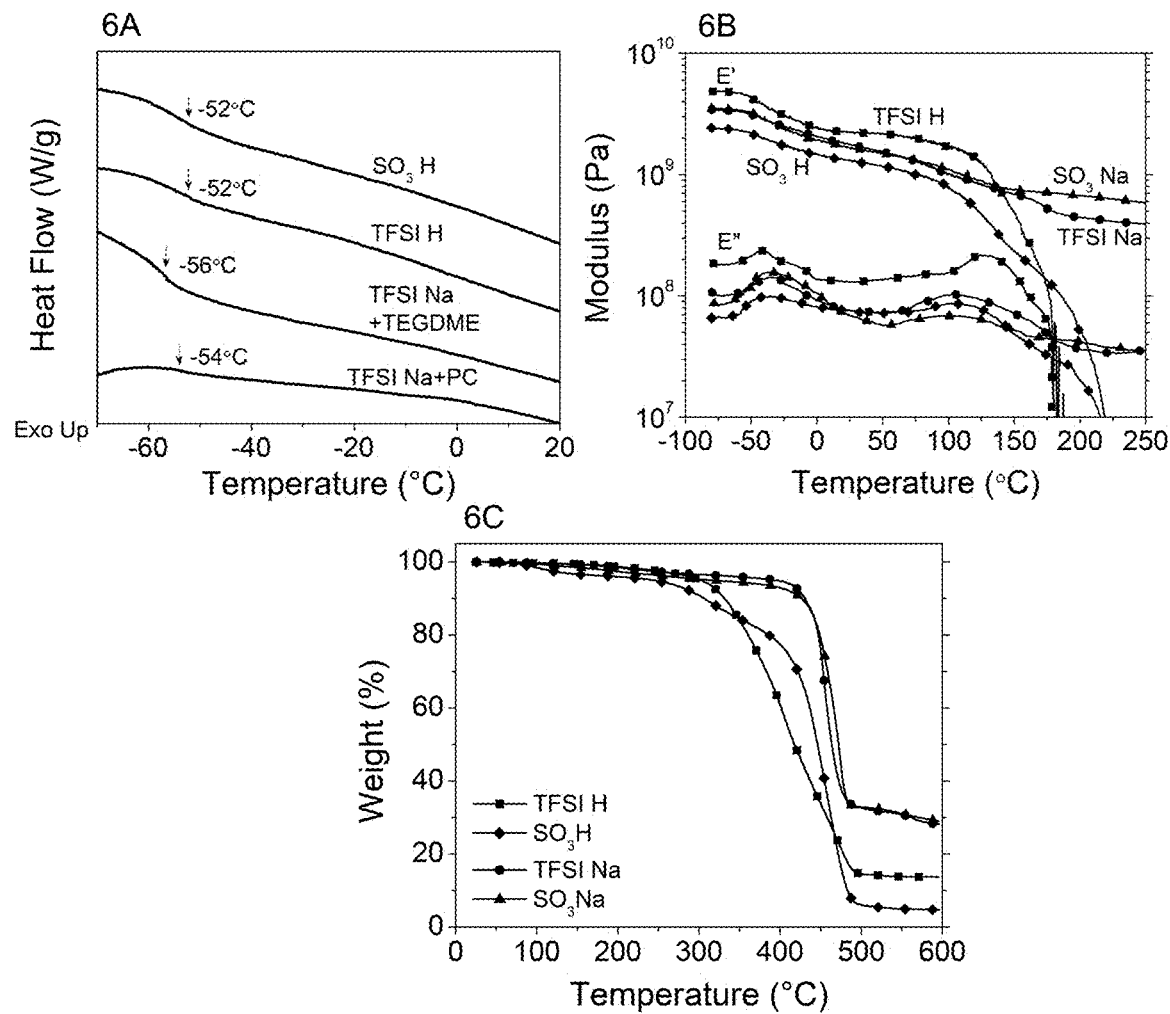
FIGS. 6A-6C.

The thermal properties of the sulfonate and TFSI membranes were compared in both proton and sodium forms. The first glass transition temperature, $T_{g,1}$, corresponds to the ethylene/propylene block. As expected, there is no change in $T_g$ of this block between the sulfonate and TFSI membranes or between proton and sodium forms (Table 1, FIG. 6A). FIG. 6A shows DSC traces of dry membranes in sulfonic acid and TFSI H forms and plasticized TFSI Na membranes. There was a slight decrease in $T_{g,1}$ (2 to 4° C. decrease) when the membrane was plasticized with TEGDME and PC. This slight decrease in $T_g$ is due to plasticization of the ethylene/propylene backbone by the solvent. The impact of plasticization is minimal compared to a more polar polymer, such as poly(ethylene oxide), where its $T_g$ decreases 10 to 20° C. upon plasticization with TEGDME (M. L. Lehmann et al., *Energy Stor. Mater.*, 21, 85-96, 2019). A minor change in $T_g$ of the uncharged block also indicates that the majority of solvent molecules are adsorbed into the ionic regions of the polymer.

The $T_g$ of the remaining blocks was not easily measured by DSC for these polymers. For this reason, DMA was employed. DMA of the solvent equilibrated samples was not performed due to excessive moisture adsorption by the polymer when exposed to air. FIG. 6B is a graph plotting modulus of the pentablock copolymer membranes in sulfonate and TFSI forms, E' is storage modulus and E" is loss modulus. As can be seen from the E" curves in the graph in FIG. 6B, a broad $T_{g,2}$ transition occurs from ~90 to 140° C., close to reported values of $T_g$ for poly(t-butyl styrene) at ~130° C. (A. Puleo et al., *Journal of Polymer Science Part B: Polymer Physics*, 27 (11), 2385-2406, 1989). Thus, this $T_{g,2}$ region is attributed to the poly(t-butyl styrene) block and occurs at a similar temperature (~115° C.) for all the membranes except the TFSI H sample. The increase in $T_{g,2}$ for the TFSI H sample is due to a combined transition corresponding to poly(t-butyl styrene) and polystyrene TFSI. The reported $T_g$ of polystyrene TFSI is 110° C., a much lower temperature than polystyrene SO₃H. The $T_g$ of highly sulfonated polystyrene typically occurs at temperatures>170° C. (T. Saito et al., *Macromolecules*, 43(2), 599-601, 2010). The E' curve for the TFSI H sample shows a rapid decrease in modulus once above $T_{g,2}$, whereas the SO₃H sample exhibits a broad decline in modulus in this region. This broadening is believed to be due to increased ionic interactions in the SO₃H sample that slow chain relaxations. The terminal region E' and E" curves of the TFSI H and SO₃H samples correspond well to the expected $T_g$ of polystyrene TFSI and polystyrene sulfonic acid. Furthermore, when converted to sodium form, both membranes exhibit a relatively insignificant decline in E' above $T_{g,2}$, which is an indication of much stronger ionic interactions between the sodium ion and both the SO₃⁻ and TFSI⁻ anions. The strong interaction between the anion and sodium cation is also demonstrated in the thermal decomposition of the membranes, as shown in the TGA traces in FIG. 6C. The $T_d$ of the membranes in sodium form is 60 to 90° C. higher than in proton form (Table 1, below).

TABLE 1

Thermal and mechanical properties of pentablock copolymer membranes.

| Sample | $T_{g,1\ DSC}$ (° C.) | $T_{g,2\ DMA}^a$ (° C.) | $T_d$ (° C.) | E$^b$ (GPa) | Stress$^{b,c}$ (MPa) | Strain$^b$ (%) | Toughness (MJ/m³) |
|---|---|---|---|---|---|---|---|
| SO₃ H | −52 | 115 | 246 | 1.3 | 9 | 46 | 4.9 |
| SO₃ Na | −52 | 116 | 318 | 1.7 | 13 | 21 | 2.2 |
| TFSI H | −52 | 127 | 302 | 2.3 | 16 | 57 | 6.5 |
| TFSI Na | −52 | 112 | 395 | 1.8 | 20 | 28 | 5.0 |

$^a T_g$ taken from the loss modulus peak.
$^b$Values taken at 20° C.
$^c$Maximum tensile stress.

Figures 7A, 7B:
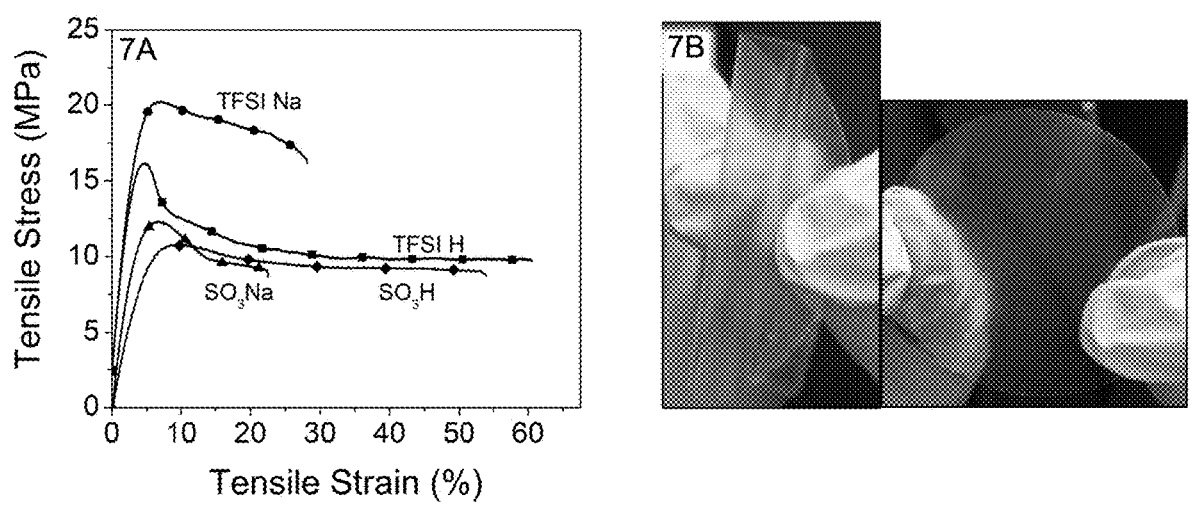
FIGS. 7A-7B.

The increased ionic interactions of the membranes in sodium form are also evident from tensile measurements of the membranes, as show in the graph in FIG. 7A. FIG. 7A shows representative stress-strain curves for the pentablock copolymer membranes, while FIG. 7B is an image of the TFSI functionalized membrane. The sodium form of the membrane exhibits a higher maximum tensile stress than the proton form and decreased elongation (Table 1). The strong ionic interactions between the TFSI anion and the sodium cation increase strength and cause the polymer to become stiffer and less elastic. Even so, these membranes have excellent toughness (both strong and flexible), with values of 6.5 and 5.0 MJ/m³ for the proton and sodium TFSI membranes, respectively (Table 1). The tensile strength and elongation at break of the TFSI H membrane (16 MPa and 57%) is greater than that of the SO₃H membrane (9 MPa and 46%), which indicates that the conversion reaction from sulfonate to TFSI did not damage the backbone structure and even enhanced mechanical strength. The TFSI Na membrane exhibits a significantly higher tensile strength (20 MPa) than that of the SO₃Na membrane (13 MPa), likely due to the change in morphology, as shown in FIG. 5.

Furthermore, the GPa range storage modulus of the membranes (from DMA, FIG. 6B) is another indication of the exceptional mechanical strength of these pentablock copolymers. The high mechanical strength combined with moderate elasticity permits the fabrication of thin membranes (20-30 μm) with low area specific resistance of the cell and easy integration into an electrochemical device.

Figure 8:
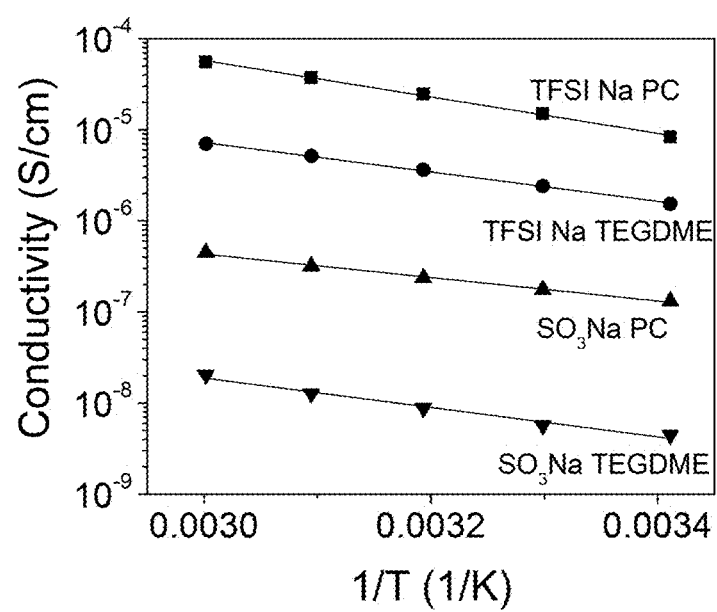
FIG. 8. Graph plotting conductivity of the pentablock copolymer membranes in sodium sulfonate and sodium TFSI forms, equilibrated in TEGDME and PC.

Thermal and mechanical analysis of the membranes suggests that there is a strong association between both the $SO_3$ and TFSI anions with the sodium ion, while the delocalized TFSI anion is expected to improve sodium ion dissociation. As a dry polymer, the switch from sulfonate to TFSI forms has herein been shown to improve Li-ion conductivity by at least one order of magnitude. Plasticization of a membrane with an organic solvent aids in the dissociation of the anion and sodium cation, and the extent to which this occurs is evidenced by membrane ionic conductivity. The sodium-ion conductivity of the membranes increases over two orders when in TFSI form compared to sulfonate form, as shown by the data plotted in FIG. 8. FIG. 8 is a graph plotting conductivity of the pentablock copolymer membranes in sodium sulfonate and sodium TFSI forms, equilibrated in TEGDME and PC. This increased conductivity indicates that the larger delocalized anion significantly improves sodium-ion conductivity in non-aqueous solvents.

Membranes plasticized with the high dielectric solvent PC exhibit a single-ion conductivity of $1.5\times10^{-5}$ S/cm compared to $1.8\times10$'S/cm at 30° C. for the sodium TFSI and sulfonate membranes, respectively. These results are comparable values reported for lithiated Nafion, which exhibits a $Li^+$ conductivity of $2.2\times10^{-6}$–$1\times10^{-5}$ S/cm in PC (M. Doyle et al., J. Membrane Sci., 184(2), 257-273, 2001). Furthermore, the extent of solvent uptake can influence the conductivity of the membranes. Membrane uptake for the TFSI form of the membrane is 33% higher in TEGDME and 13% lower in PC compared to the sulfonated form of the membrane. This difference in uptake influences the relative increase in conductivity between the sulfonate and TFSI membranes in TEGDME and PC. The conductivity of the TFSI membrane equilibrated in TEGDME increases almost 3 orders, while the conductivity of the membrane equilibrated in PC increases 2 orders. The demonstrated improvement in conductivity is important for non-aqueous systems, which inherently have a lower conductivity than aqueous systems. Furthermore, glymes are a well known class of solvents in non-aqueous systems due to their superior electrochemical stability compared to carbonate solvents.

There is often a trade-off between electrolyte uptake, mechanical strength, conductivity, and selectivity of the membrane. An increase in electrolyte uptake increases conductivity but decreases mechanical integrity, limiting the application of the membrane for non-aqueous flow or solid-state batteries. In addition, the effect of non-aqueous electrolyte uptake and electrolyte salt concentration on cation selectivity of cation exchange membranes (CEMs) has not been studied previously. To identify the optimal performance of the membrane, a greater understanding is needed of the effect of an electrolyte on membrane transport, selectivity, and electrolyte uptake. Studying membrane properties in an electrolyte solution is also important for non-aqueous flow battery applications, where the membrane is constantly bathed in an electrolyte solution. In most cases, the effect of the chosen electrolyte concentration on membrane performance is not considered when performing flow battery tests. Furthermore, plasticizing a membrane with a salt-containing electrolyte solution is a method to increase the number of charges within the membrane to improve ionic conductivity for solid-state batteries. To systematically study the effect of a non-aqueous electrolyte on membrane performance, membranes were equilibrated in solutions consisting of 0 to 1 M NaTf in either PC or TEGDME. Membrane parameters including uptake, conductivity, and transport number were then studied. In addition, the amount of salt absorbed into the membrane at varying salt concentrations was quantified.

Figures 9A, 9B, 9C, 9D:
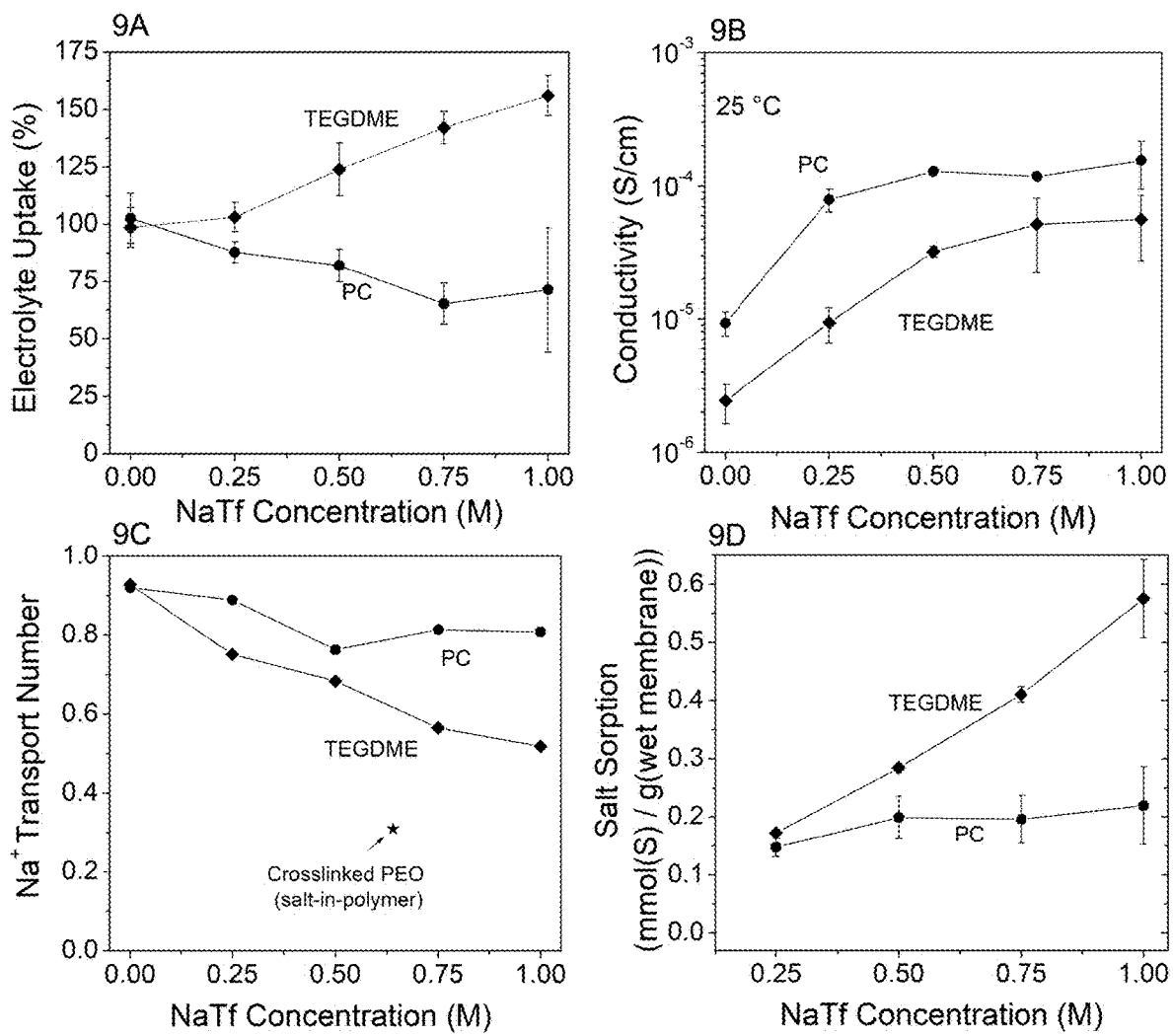
FIGS. 9A-9D.

The electrolyte uptake of the membrane steadily increases with increasing salt concentration for TEGDME, while the opposite trend is observed for PC, as shown in the data graphically presented in FIG. 9A. FIG. 9A is a plot of electrolyte uptake of the TFSI Na pentablock copolymer membranes. The membranes demonstrate a 3× increase in conductivity when equilibrated in a 0.25M NaTf electrolyte solution, compared with the neat plasticizer without salt as shown in the data graphically presented in FIG. 9B. FIG. 9B is a plot of room temperature conductivity of TFSI Na membranes. The conductivity continued to increase with higher electrolyte salt concentration, reaching a room temperature conductivity of $1.3\times10$'S/cm at 0.5 M NaTf for PC and $5.2\times10^{-5}$ S/cm at 0.75 M NaTf for TEGDME. While a direct comparison between this system and others is difficult due to different salt/polymer/counter-ions used, the values obtained here are similar to a poly(phenylene oxide) CEM utilized in a non-aqueous flow battery study. The poly (phenylene oxide) CEM with a tri-sulfonate side chain exhibits a conductivity of $6.0\times10^{-5}$ S/cm in a 1 M LiFSI/ dimethyl carbonate electrolyte (P. M. McCormack et al., J. Power Sources, 460, 228107-228117, 2020). In another study, Nafion exhibited a conductivity of $1.6\times10^{-5}$ S/cm and $8.1\times10$'S/cm in a 0.5 M and 1 M $LiPF_6$/PC electrolyte, respectively (L. Su et al., J. Electrochem. Soc., 163(1), A5253-A5262, 2016). FIG. 9D is a plot of sulfur uptake (from $Tf^-$) into TFSI Na membrane, at various salt concentrations in PC and TEGDME. As shown by the data in FIG. 9D, conductivity of the membranes equilibrated in the TEGDME and PC electrolytes follow a similar trend as salt absorption, which indicates that the conductivity increase is directly related to the number of 'free' ions within the membrane. These results demonstrate that the addition of even a low concentration of free ions into a CEM via the plasticizing solution significantly improves ionic conductivity.

While the bulk conductivity of a membrane is important, measuring the transport number provides information on the contribution of the cation to conductivity. Maintaining a high transport number is critical for reducing cell polarization and improving battery performance. The transport number of ion exchange membranes in aqueous electrolyte solutions is generally higher than in organic electrolyte solutions. This phenomenon may be due to a difference in the Donnan exclusion potential (the ability of an anionic polymer to exclude anions) and a significantly lower mean activity coefficient between organic solvents and water. The decrease in transport number for organic solutions is likely due to a weaker interaction between the ionic groups in the polymer and the solvent, which permits a higher number of free ions to enter the membrane, thus decreasing the transport number. This phenomenon is evidenced by the lower transport number of membranes equilibrated in solutions with the low dielectric constant solvent TEGDME compared to the high dielectric solvent PC, as shown by the data graphically presented in FIG. 9C. FIG. 9C is a plot of cation transport number, with a TEGDME plasticized salt-in-polymer crosslinked poly(ethylene oxide), (PEO), membrane as reference. The cation transport number is maintained at a higher value for the PC electrolyte, while the transport number in the TEGDME-based electrolyte continues to decline with increasing salt concentration. In addition to the difference in the Donnan exclusion potential between PC and TEGDME, the ethylene oxide units of TEGDME preferentially coordinate with the cation, thereby reducing its mobility. Thus, the transport number of the TEGDME system is lower than the PC system. The anion ($BF_4^-$) transport number of a 0.05 M $TEABF_4$/PC electrolyte was previously found to be 0.87 through a synthesized styrene-divinyl benzene anion exchange membrane (D.-H. Kim et al., *J. Membrane Sci.*, 454, 44-50, 2014), which is consistent with the transport number reported here at the lowest concentration of the PC electrolyte (0.89). Notably, the cation transport number is maintained above 0.75 for PC and 0.5 for TEGDME. The high transport number demonstrates that the tethered anion within the polymer aids in restricting the mobility of the free anions introduced into the membrane from the equilibrating solution. The degree to which this depends on a specific tethered anion is unknown. The TFSI anion's improved sodium ion dissociation may contribute to promoting cation transport and excluding free anions to a greater extent than the sulfonate anion and warrants further investigation. The high transport number demonstrated here is a significant improvement over salt-in-polymer systems, where the transport number is typically below 0.5 (K. Pozyczka et al., *Electrochim Acta*, 227, 127-135, 2017). For example, a TEGDME plasticized crosslinked poly(ethylene oxide) membrane utilizing the same salt (NaTf) as in the present work exhibited a $Na^+$ transport number of 0.31 (FIG. 9C) (M. L. Lehmann et al., *Energy Stor. Mater.*, 21, 85-96, 2019).

Measuring the amount of salt adsorbed into the membrane provides a quantitative measure of the role of Donnan exclusion in non-aqueous systems. Salt sorption by the membrane equilibrated in the various concentrations of electrolyte solutions was measured by the moles of free sulfur (from $Tf^-$ anion) within the membrane. The equilibrated membranes were dried to remove the organic solvents, then heated in a known volume of nitric acid to extract the salt from the membrane. Utilizing ICP-OES, the moles of sulfur in the aqueous acid solution were measured. The moles of sulfur absorbed into the membrane, normalized to the mass of the electrolyte equilibrated membranes, shows an almost linear increase with salt concentration for TEGDME, while for the PC electrolyte, the adsorption of the anion into the membrane is relatively constant (FIG. 9D). The amount of salt absorbed into the membrane increases with increasing electrolyte concentration for TEGDME, which indicates that the amount of salt absorbed into the membrane is proportional to the external solution concentration. Thus, the effect of Donnan exclusion is weaker in TEGDME than PC, especially at high electrolyte concentrations. This also explains the trends observed for transport number and conductivity. The continued increase in anion sorption for TEGDME increases conductivity but results in a continued decrease in transport number. The difference in Donnan exclusion between these two solvents is due to their vastly different dielectric constants, in addition to their salt solvating properties. PC exhibits better Donnan exclusion due to its ability to dissociate the anion and cation within the membrane into free ions, thereby creating a higher electrostatic repulsion. In contrast, TEGDME associates with the cation, creating solvent-separated ion pairs and a lower electrostatic potential within the membrane, allowing more salt to enter the membrane.

In non-aqueous redox flow batteries with a cationic charge carrier, electrolyte concentrations are typically in the range of 0.6 to 1 M in PC, TEGDME, diglyme, or dimethyl carbonate (E. C. Self et al., *ACS Energy Lett.* 4(11), 2593-2600, 2019). This study suggests that the best membrane performance is obtained at moderate electrolyte concentrations (0.5 to 0.75M), especially for low dielectric constant solvents. In addition, plasticization of a CEM with an electrolyte solution of low to moderate salt concentration is demonstrated to improve ionic conductivity while maintaining a transport number above 0.75, a desirable combination of factors for solid-state Li-ion, Na-ion, and Li-metal batteries. Furthermore, the above results demonstrate the importance of studying membrane performance in various non-aqueous electrolytes at differing concentrations to obtain optimal membrane performance for each specific application.

Conclusions

Performance improvements of CEMs for non-aqueous energy storage systems have primarily been limited to modifications of the polymer structure and plasticization with small molecule solvents. Herein is described a method for improving the conductivity of membranes for non-aqueous energy storage through plasticization with a tailored electrolyte solution. Furthermore, the facile modification of a commercially available sulfonated pentablock copolymer, Nexar™, to TFSI form significantly improves membrane conductivity over two orders of magnitude. Membrane conductivity further increases to $3.2 \times 10^{-5}$ S/cm and $1.3 \times 10^{-4}$ S/cm at 25° C. when equilibrated in a 0.5 M NaTf TEGDME or PC-based electrolyte respectively. Significantly, a high cation transport number (>0.75) was maintained across the concentration range for PC and at low salt concentrations for TEGDME. This study provides insights into the factors that govern membrane performance in non-aqueous systems, where optimum membrane performance, a balance between uptake, conductivity, and cation selectivity can be achieved at a moderate electrolyte salt concentration. Moreover, it has herein been demonstrated that plasticization of a CEM with an electrolyte solution is an effective method to improve membrane performance, providing a new design system for Li and Na-ion batteries. These results indicate that the polymer electrolytes described herein may be also be useful for flow batteries, solid-state batteries, and other non-aqueous energy storage systems.

While there have been shown and described what are at present considered the preferred embodiments of the invention, those skilled in the art may make various changes and modifications which remain within the scope of the invention defined by the appended claims.

What is claimed is:

1. A solid electrolyte composition comprising the following components:
   (i) an organic polymer comprising a polymeric backbone and pendant groups, wherein said polymeric backbone contains at least one polyethylene and/or polypropylene block and at least a portion of said pendant groups are phenyl groups, wherein a portion of said phenyl groups are attached to an anionic group associated with a first metal ion selected from the group consisting of lithium, sodium, potassium, magnesium, calcium, zinc, and aluminum ions;
   (ii) a solvent homogeneously incorporated in the polymer to result in a polymer gel system; and
   (iii) a metal salt dissolved in the solvent in a molar concentration of 0.05 M to 1.5 M and containing a second metal ion associated with an anion, wherein the second metal ion is selected from the group consisting of lithium, sodium, potassium, magnesium, calcium, zinc, and aluminum ions, provided that the first and second metal ions are the same.

2. The solid electrolyte composition of claim 1, wherein the organic polymer is a copolymer.

3. The solid electrolyte composition of claim 1, wherein the organic polymer is a block copolymer and at least one block of the block copolymer contains the anionic group associated with the first metal ion.

4. The solid electrolyte composition of claim 1, wherein the anionic group in component (i) is selected from the group consisting of sulfonate, sulfate, carboxylate, sulfonimide, borate, phosphonate, and phosphate anionic groups.

5. The solid electrolyte composition of claim 1, wherein the anionic group in component (i) is a sulfonimide anionic group.

6. The solid electrolyte composition of claim 5, wherein the sulfonimide anionic group in component (i) is a fluoroalkylsulfonimide anionic group.

7. The solid electrolyte composition of claim 6, wherein the fluoroalkylsulfonimide anionic group has the following structure:

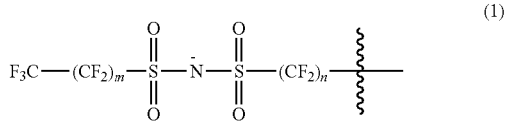

wherein subscripts m and n are independently 0 or an integer of 1 or above.

8. The solid electrolyte composition of claim 1, wherein the solvent is selected from the group consisting of a carbonate, sulfone, ether, silicon-containing, ester, nitrile, amide, organochloride, ketone, sulfoxide, phosphonate ester solvent, and phosphate ester solvent.

9. The solid electrolyte composition of claim 1, wherein the solvent is a carbonate solvent.

10. The solid electrolyte composition of claim 1, wherein the solvent is an ether solvent.

11. The solid electrolyte composition of claim 1, wherein the metal salt dissolved in the solvent is present in a molar concentration of 0.25 M to 1.5 M.

12. The solid electrolyte composition of claim 1, wherein the anion in the metal salt is selected from the group consisting of sulfonate, sulfate, carboxylate, sulfonimide, borate, phosphonate, and phosphate anions, and such anions containing one or more hydrocarbon groups.

13. The solid electrolyte composition of claim 1, wherein said solid electrolyte is in the shape of a film having a thickness of 1-100 microns.

14. A solid-state battery comprising:
a) an anode;
b) a cathode; and
c) a solid electrolyte composition in contact with said anode and cathode and comprising the following components:
(i) an organic polymer comprising a polymeric backbone and pendant groups, wherein said polymeric backbone contains at least one polyethylene and/or polypropylene block and at least a portion of said pendant groups are phenyl groups, wherein a portion of said phenyl groups are attached to an anionic group associated with a first metal ion selected from the group consisting of lithium, sodium, potassium, magnesium, calcium, zinc, and aluminum ions;
(ii) a solvent homogeneously incorporated in the polymer to result in a polymer gel system; and
(iii) a metal salt dissolved in the solvent in a molar concentration of 0.05 M to 1.5 M and containing a second metal ion associated with an anion, wherein the second metal ion is selected from the group consisting of lithium, sodium, potassium, magnesium, calcium, zinc, and aluminum ions, provided that the first and second metal ions are the same.

15. The solid-state battery of claim 14, wherein the solid-state battery is a lithium-based battery and the first and second metal ions are lithium ions.

16. The solid-state battery of claim 14, wherein the organic polymer is a copolymer.

17. The solid-state battery of claim 14, wherein the organic polymer is a block copolymer and at least one block of the block copolymer contains the anionic group associated with the first metal ion.

18. The solid-state battery of claim 14, wherein the anionic group in component (i) is selected from the group consisting of sulfonate, sulfate, carboxylate, sulfonimide, borate, phosphonate, and phosphate anionic groups.

19. The solid-state battery of claim 14, wherein the anionic group in component (i) is a sulfonimide anionic group.

20. The solid-state battery of claim 19, wherein the sulfonimide anionic group in component (i) is a fluoroalkylsulfonimide anionic group.

21. The solid-state battery of claim 20, wherein the fluoroalkylsulfonimide anionic group has the following structure:

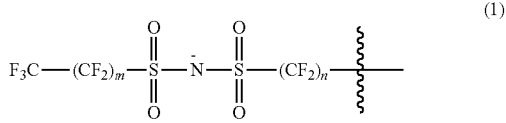

wherein, subscripts m and n are independently 0 or an integer of 1 or above.

22. The solid-state battery of claim 14, wherein the solvent is selected from the group consisting of a carbonate, sulfone, ether, silicon-containing, ester, nitrile, amide, organochloride, ketone, sulfoxide, phosphonate ester solvent, and phosphate ester solvent.

23. The solid-state battery of claim 14, wherein the solvent is a carbonate solvent.

24. The solid-state battery of claim 14, wherein the solvent is an ether solvent.

25. The solid-state battery of claim 14, wherein the metal salt dissolved in the solvent is present in a molar concentration of 0.25 M to 1.5 M.

26. The solid-state battery of claim 14, wherein the anion in the metal salt is selected from the group consisting of sulfonate, sulfate, carboxylate, sulfonimide, borate, phosphonate, and phosphate anions, and such anions containing one or more hydrocarbon groups.

27. The solid-state battery of claim 14, wherein said solid electrolyte is in the shape of a film having a thickness of 1-100 microns.

* * * * *